(12) United States Patent
Wigren

(10) Patent No.: US 9,001,686 B2
(45) Date of Patent: Apr. 7, 2015

(54) INTERFERENCE ESTIMATION WITH TDM

(71) Applicant: Telefonaktiebolaget L M Ericsson (publ), Stockholm (SE)

(72) Inventor: Torbjörn Wigren, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 188 days.

(21) Appl. No.: 13/853,369

(22) Filed: Mar. 29, 2013

(65) Prior Publication Data

US 2014/0293802 A1   Oct. 2, 2014

(51) Int. Cl.
*H04L 12/26* (2006.01)
*H04W 24/08* (2009.01)
*H04W 24/00* (2009.01)

(52) U.S. Cl.
CPC ............. *H04W 24/08* (2013.01); *H04W 24/00* (2013.01)

(58) Field of Classification Search
None
See application file for complete search history.

(56) References Cited

U.S. PATENT DOCUMENTS

| | | | |
|---|---|---|---|
| 7,912,461 | B2 | 3/2011 | Wigren |
| 2003/0206537 | A1 | 11/2003 | Choi et al. |
| 2003/0218974 | A1 | 11/2003 | Zuniga |
| 2007/0177536 | A1 | 8/2007 | Brueck et al. |
| 2011/0097070 | A1 | 1/2011 | Wigren |
| 2011/0098014 | A1* | 4/2011 | Martens et al. ............... 455/307 |
| 2012/0196589 | A1 | 8/2012 | Wigren |

FOREIGN PATENT DOCUMENTS

| | | |
|---|---|---|
| EP | 1 679 923 A1 | 7/2006 |
| EP | 1 727 388 B1 | 11/2006 |
| WO | 2007/024166 A1 | 3/2007 |
| WO | 2008/039123 A1 | 4/2008 |
| WO | 2011/071430 A1 | 6/2011 |
| WO | 2011/119075 A1 | 9/2011 |
| WO | 2013-043093 A1 | 3/2013 |

OTHER PUBLICATIONS

Torbjörn Wigren et al., "Estimation of uplink WCDMA load in a single RBS", Sweden (5 pages).
Torbjörn Wigren, "Soft Uplink Load Estimation in WCDMA", IEEE Transactions on Vehicular Technology, vol. 58, No. 2, Feb. 2009, pp. 760-772.

(Continued)

*Primary Examiner* — Afshawn Towfighi

(57) ABSTRACT

Mobile broadband traffic has been exploding in wireless networks resulting in an increase of interferences and reduced operator control. Networks are also becoming more heterogeneous putting additional demand in interference management. Scheduler schedules uplink transmissions from UEs based on a load prediction algorithm that typically assumes worst case. However, UEs do not always use full power granted, and thus, much of granted radio resources are wasted. To address these and other issues, technique(s) to accurately predict/estimate other cell interferences and thermal noise separately and to accurately predict/estimate load utilization probability and variance is(are) described. Inventive estimation technique(s) can be used to schedule UEs to more fully utilize available radio resources, e.g., in TD-scheduling operations. Extended Kalman filtering can be adapted for use in estimation providing low order computational complexity.

31 Claims, 15 Drawing Sheets

(56) References Cited

OTHER PUBLICATIONS

Torbjörn Wigren, "Recursive Noise Floor Estimation in WCDMA", IEEE Transactions on Vehicular Technology, vol. 59, No. 5, Jun. 2010, pp. 2615-2620.

Inventor: Torbjörn Wigren, U.S. Appl. No. 13/656,581, filed Oct. 19, 2012, "Method, Apparatus, and System for Interference and Noise Estimation".

Inventor: Torbjörn Wigren, U.S. Appl. No. 13/488,187, filed Jun. 4, 2012, "Other Cell Interference Estimation".

Inventor: Torbjörn Wigren, U.S. Appl. No. 13/776,328, filed Feb. 25, 2013, "Grant Utilization Based Other Cell Interference Estimation".

International Search Report and Written Opinion mailed May 22, 2014 in International Application No. PCT/SE2014/050078 (13 pages total).

International Search Report and Written Opinion mailed Jan. 27, 2014 in International Application No. PCT/SE2013/050643 (13 pages total).

Torbjörn Wigren, "Low Complexity Kalman Filtering for Inter-Cell Interference and Power Based Load Estimation in the WCDMA Uplink", Signal Processing and Communication Systems (ICSPS), 2011 $5^{th}$ International Conference on, Dec. 2011 (10 pages).

Inventor: Torbjörn Wigren, U.S. Appl. No. 13/993,429, filed Jun. 12, 2013, "Radio Base Station and Method Therein".

International Search Report and Written Opinion with transmittal sheet dated Jan. 22, 2014 in International Application No. PCT/SE2013/050561 (12 pages total).

Kambiz Shoarinejad et al., "Integrated Predictive Power Control and Dynamic Channel Assignment in Mobile Radio Systems", IEEE Transactions on Wireless Communications, vol. 2, No. 5, Sep. 2003, pp. 976-988.

International Search Report and Written Opinion mailed Jun. 26, 2014 in International Application No. PCT/SE2014/050203 (12 pages total).

\* cited by examiner

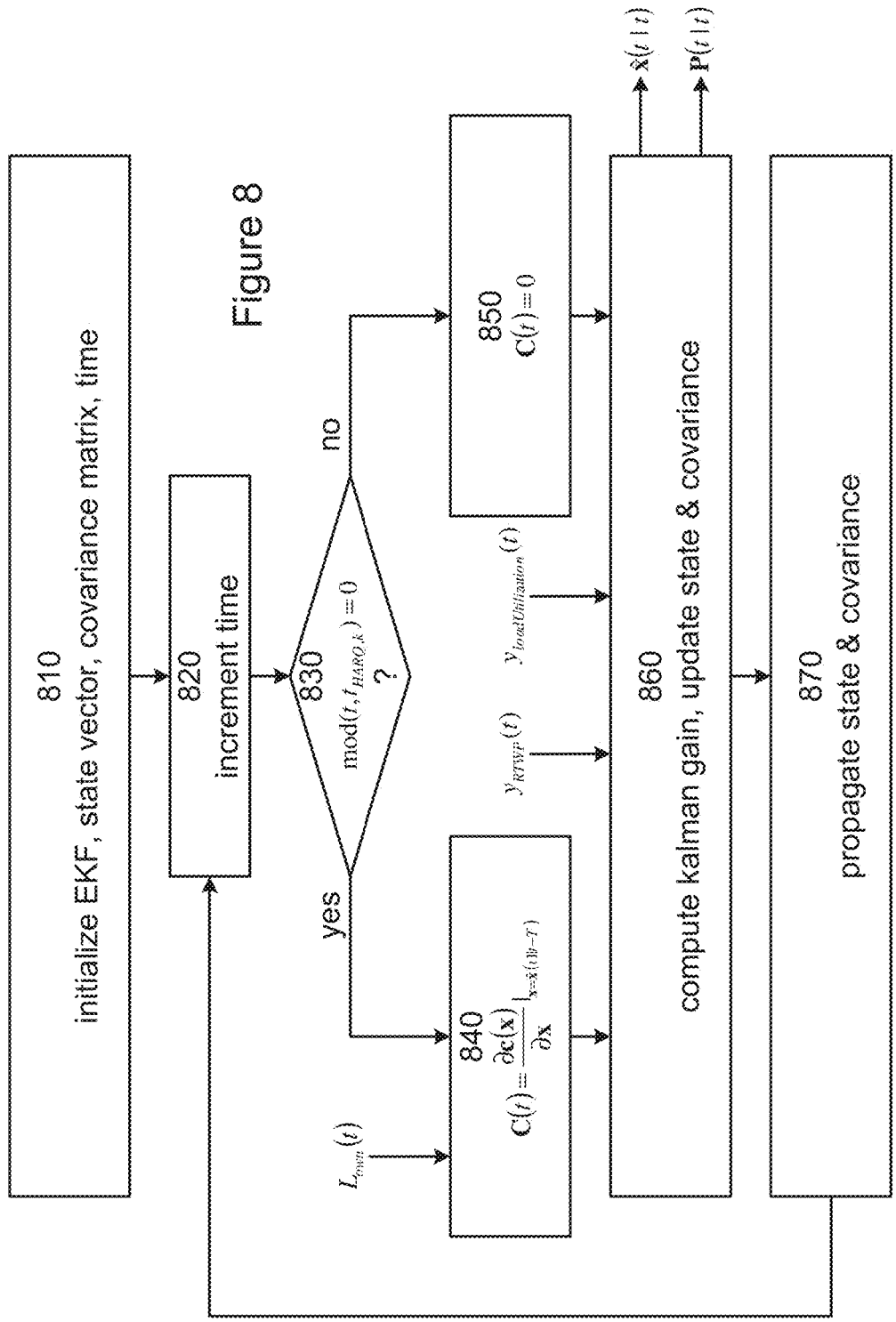

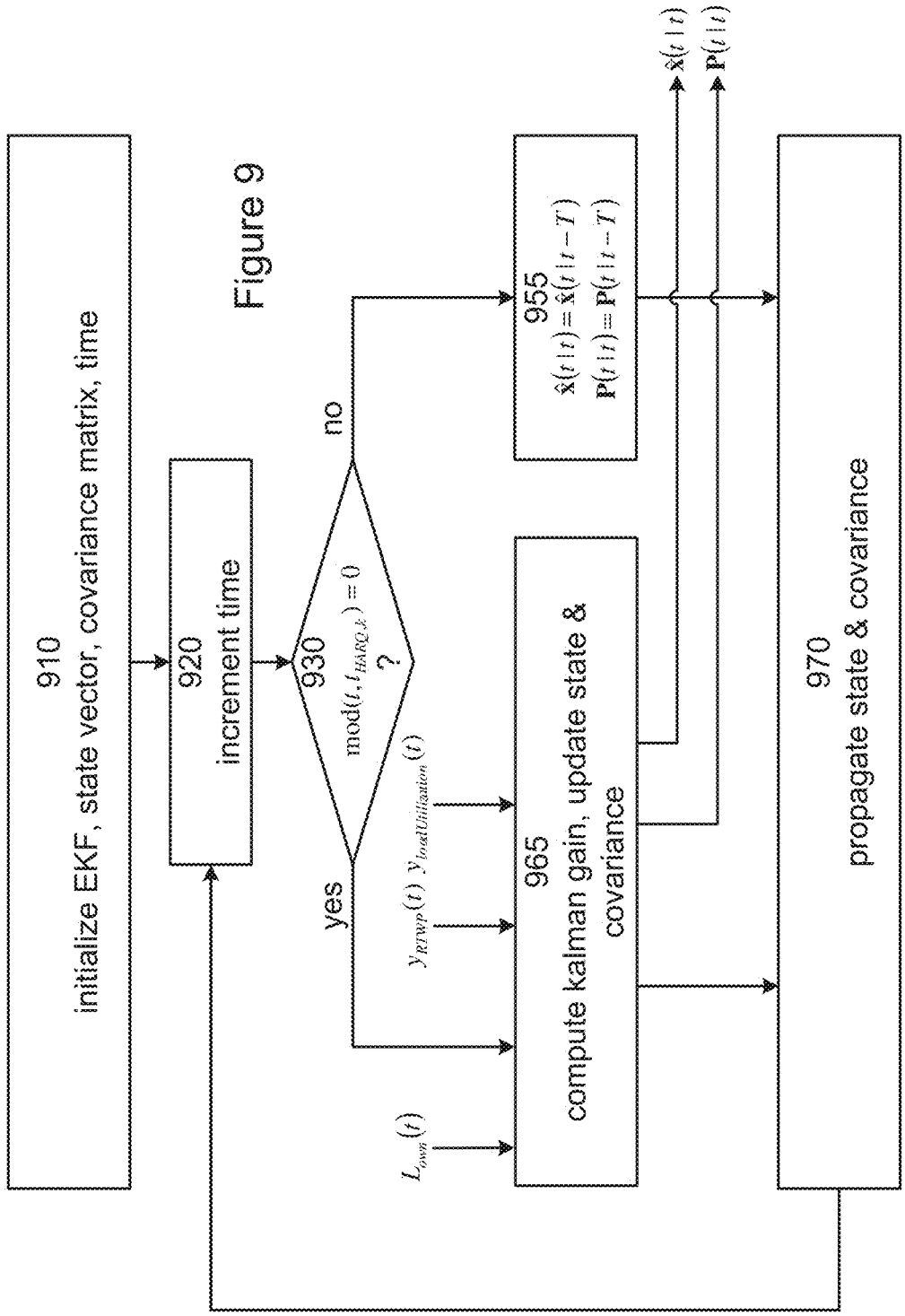

INTERFERENCE ESTIMATION WITH TDM

RELATED APPLICATION

This application may be related, at least in part, to U.S. application Ser. No. 13/488,187 entitled "OTHER CELL INTERFERENCE ESTIMATION" filed Jun. 4, 2012; to U.S. application Ser. No. 13/656,581 entitled "METHOD, APPARATUS, AND SYSTEM FOR INTERFERENCE AND NOISE ESTIMATION" filed Oct. 19, 2012; and to U.S. application Ser. No. 13/776,328 entitled "GRANT UTILIZATION BASED OTHER CELL INTERFERENCE ESTIMATION" filed Feb. 25, 2013, the entire contents of which are hereby incorporated by reference.

TECHNICAL FIELD

The technical field of the present disclosure generally relates to estimating other cell interferences in a wireless network. In particular, the technical field relates to apparatus (es), method(s), and/or system(s) for estimating other cell interferences in TDM.

BACKGROUND

Recently, at least the following trends have emerged in field of cellular telephony. First, mobile broadband traffic has been exploding in wireless networks such as WCDMA (wideband code division multiple access). The technical consequence is a corresponding steep increase of the interference in these networks, or equivalently, a steep increase of the load. This makes it important to exploit the load headroom that is left in the most efficient way.

Second, cellular networks are becoming more heterogeneous, with macro RBSs (radio base station) being supported by micro and pico RBSs at traffic hot spots. Furthermore, home base stations (e.g., femto RBSs) are emerging in many networks. This trend puts increasing demands on inter-cell interference management.

Third, the consequence of the above is a large increase of the number of network nodes in cellular networks, together with a reduced operator control. There is therefore a strong desire to introduce more self-organizing network (SON) functionality. Such functionality may support interference management by automatic interference threshold setting and adaptation, for a subset of the nodes of the cellular network.

As a result, there are problems that can hinder providing efficient service. In WCDMA for example, the UEs (user equipments) may or may not utilize the power granted by the EUL (enhanced uplink) scheduler. This leads to an inaccuracy of the load prediction step, where the scheduler bases its scheduling decision on a prediction of the resulting air interface load of the traffic it schedules. This is so since the 3GPP standard has an inherent delay of about at least 5 TTIs (transmission time interval) from the scheduling decision until the interference power appears over the air interface. Also the WCDMA load prediction does not account for all imperfections in the modeling of an UL (uplink) radio receiver. This can lead to additional inaccuracies in the load prediction and estimation steps.

The inventor is not aware of any practical other cell interference estimation algorithm available that can provide other cell interference estimates with an inaccuracy better than 10-20%, and does so with close to transmission time interval (TTI, typically 2 ms or 10 ms) bandwidth (typically 250 or 50 Hz) over interested power and load ranges. As a result, it is not possible to make optimal scheduling decisions since the exact origin of the interference power in the UL is unknown.

Load Estimation without Other Cell Interference Estimation

Following is a discussion on measurement and estimation techniques to measure instantaneous total load on the uplink air interface given in a cell of a WCDMA system. In general, a load at the antenna connector is given by noise rise, also referred to as rise over thermal, RoT(t), defined by:

$$RoT(t) = \frac{P_{RTWP}(t)}{P_N(t)}, \qquad (1)$$

where $P_N(t)$ is the thermal noise level as measured at the antenna connector. For the purposes of discussion, $P_{RTWP}(t)$ may be viewed as the total wideband power defined by:

$$P_{RTWP}(t) = \sum_{i=1}^{I} P_i(t) + P_{other}(t) + P_N(t), \qquad (2)$$

also measured at the antenna connector. The total wideband power $P_{RTWP}(t)$, is unaffected by any de-spreading applied. In (2), $P_{other}(t)$ represents the power as received from one or more cells of the WCDMA system other than an own cell. The $P_i(t)$ are the powers of the individual users. One major difficulty of any RoT estimation technique is in the inherent inability to separate the thermal noise $P_N(t)$ from the interference $P_{other}(t)$ from other cells.

Another specific problem that needs to be addressed is that the signal reference points are, by definition, at the antenna connectors. The measurements are however obtained after the analog signal conditioning chain, in the digital receiver. The analog signal conditioning chain introduces a scale factor error of about 1 dB (1-sigma) that is difficult to compensate for. Fortunately, all powers of (2) are equally affected by the scale factor error so when (1) is calculated, the scale factor error is cancelled as follows:

$$RoT^{Digital\ Receiver}(t) = \qquad (3)$$

$$\frac{P_{RTWP}^{Digital\ Receiver}(t)}{P_N^{Digital\ Receiver}(t)} = \frac{\gamma(t)P_{RTWP}^{Antenna}(t)}{\gamma(t)P_N^{Antenna}(t)} = RoT^{Antenna}(t).$$

To understand the fundamental problem of interferences from other cells when performing load estimation, note that:

$$P_{other}(t)+P_N(t)=E[P_{other}(t)]+E[P_N(t)]+\Delta P_{other}(t)+\Delta P_N(t). \qquad (4)$$

where E[ ] denotes a mathematical expectation and where Δ denotes a variation around the mean. The fundamental problem can now be clearly seen. Since there are no measurements available in the RBS that are related to the other cell interference, a linear filtering operation can at best estimate the sum $E[P_{other}(t)]+E[P_N(t)]$. This estimate cannot be used to deduce the value of $E[P_N(t)]$. The situation is the same as when the sum of two numbers is available. Then there is no way to figure out the individual values of $E[P_{other}(t)]$ and $E[P_N(t)]$. It has also been formally proved that the thermal noise power floor is not mathematically observable in case there is a non-zero mean other cell interference present in the uplink (UL).

FIG. 1 illustrates a conventional algorithm that estimates a noise floor. The illustrated algorithm is referred to as a sliding window algorithm, and estimates the RoT as given by equation (1). The main problem solved by this conventional estimation algorithm is that it can provide an accurate estimation of the thermal noise floor N(t). Since it is not possible to obtain exact estimates of this quantity due to the other cell interference, the estimator therefore applies an approximation, by consideration of a soft minimum as computed over a relative long window in time. It is important to understand that this estimation relies on the fact that the noise floor is constant over very long periods of time (disregarding the small temperature drift).

One significant disadvantage of the sliding window algorithm is that the algorithm requires a large amount of storage memory. This becomes particularly troublesome in case a large number of instances of the algorithm is needed, as may be the case when base stations serve many cells and when techniques like 4-way receiver diversity is introduced in the WCDMA UL is introduced in the uplink. A recursive algorithm has been introduced to reduce the memory consumption. Relative to the sliding window algorithm, the recursive algorithm can reduce the memory requirement by a factor of more than one hundred.

Load Prediction without Other Cell Interference Estimation

Following is a discussion on techniques to predict instantaneous load on the uplink air interface ahead in time. The scheduler uses this functionality. The scheduler tests different combinations of grants to determine the best combinations, e.g., maximizing the throughput. This scheduling decision will only affects the air interface load after a number of TTIs (each such TTI a predetermined time duration such as 2 or 10 ms), due to grant transmission latency and UE latency before the new grant takes effect over the air interface.

In a conventional SIR (signal-to-interference ratio) based method, the prediction of uplink load, for a tentative scheduled set of UEs and grants, is based on the power relation defined by:

$$P_{RTWP}(t) - P_N(t) = \sum_{i=1}^{N} L_i(t) P_{RTWP}(t) + P_{other}(t), \quad (5)$$

where $L_i(t)$ is the load factor of the i-th UE of the own cell. As indicated, $P_{other}(t)$ denotes the other cell interference. The load factors of the own cell are computed as follows. First, note that:

$$(C/I)_i(t) = \frac{P_i(t)}{P_{RTWP}(t) - (1-\alpha)P_i} = \quad (6)$$

$$\frac{L_i(t) P_{RTWP}(t)}{P_{RTWP}(t) - (1-\alpha)L_i(t)P_{RTWP}(t)} = \frac{L_i(t)}{1-(1-\alpha)L_i(t)}$$

$$\Leftrightarrow$$

$$L_i(t) = \frac{(C/I)_i(t)}{1+(1-\alpha)(C/I)_i(t)},$$

$$i = 1, \ldots, I,$$

where I is the number of UEs in the own cell and α is the self-interference factor. The carrier to interference values, $(C/I)_i(t)$, i=1, ..., I, are then related to the SINR (measured on the DPCCH channel) as follows:

$$(C/I)_i(t) = \quad (7)$$

$$\frac{SINR_i(t)}{W_i} \frac{RxLoss}{G} \times \left(1 + \frac{\beta_{DPDCH,i}^2(t) + \beta_{EDPCCH,i}^2(t) + n_{codes,i}(t)\beta_{EDPDCH,i}^2(t) + \beta_{HSDPCCH,i}^2(t)}{\beta_{DPCCH}^2(t)}\right),$$

$$i = 1, \ldots, I.$$

In (7), $W_i$ represents the spreading factor, RxLoss represents the missed receiver energy, G represents the diversity gain and the β:s represent the beta factors of the respective channels. Here, inactive channels are assumed to have zero data beta factors.

The UL load prediction then computes the uplink load of the own cell by a calculation of (6) and (7) for each UE of the own cell, followed by a summation:

$$L_{own}(t) = \sum_{i=1}^{I} L_i(t), \quad (8)$$

which transforms (5) to:

$$P_{RTWP}(t) = L_{own}(t)P_{RTWP}(t) + P_{other}(t) + P_N(t). \quad (9)$$

Dividing (9) by $P_N(t)$ shows that the RoT can be predicted k TTIs ahead as:

$$RoT(t+kT) = \frac{P_{other}(t)/P_N(t)}{1-L_{own}(t)} + \frac{1}{1-L_{own}(t)}. \quad (10)$$

In the SIR based load factor calculation, the load factor $L_i(t)$ is defined by (6). However, in a power based load factor calculation, the load factor $L_i(t)$ can be defined by:

$$L_i(t) = \frac{P_i(t)}{P_{RTWP}(t)}, \quad (11)$$

$$i = 1, \ldots, I,$$

and equations (8)-(10) may be calculated based on the load factor $L_i(t)$ of (11) to predict the RoT k TTIs ahead. An advantage of the power based load factor calculation is that the parameter dependency is reduced. But on the downside, a measurement of the UE power is needed.

In heterogeneous networks (HetNets), different kinds of cells are mixed. A problem that arises in Hetnets in that the cells are likely to have different radio properties in terms of (among others):
 radio sensitivity;
 frequency band;
 coverage;
 output power;
 capacity; and
 acceptable load level.

This can be an effect of the use of different RBS sizes (macro, micro, pico, femto), different revisions (different receiver technology, SW quality), different vendors, the purpose of a specific deployment, and so on. An important factor in HetNets is that of the air interface load management, i.e., the issues associated with the scheduling of radio resources in different cells and the interaction between cells in terms of inter-cell interference.

These issues are exemplified with reference to FIG. 2 which illustrates a low power cell with limited coverage intended to serve a hotspot. To enable sufficient coverage of the hot spot, an interference suppressing receiver like the G-rake+ is used. One problem is now that the low power cell is located in the interior of and at the boundary of a specific macro cell. Also, surrounding macro cells interfere with the low power cell rendering a high level of other cell interference in the low power cell which, despite the advanced receiver, reduces the coverage to levels that do not allow coverage of the hot spot. As a result, UEs of the hot spot are connected to the surrounding macro cells, which can further increase the other cell interference experienced by the low power cell.

SUMMARY

A non-limiting aspect of the disclosed subject matter is directed to a method performed in a radio network node of a wireless network for determining other cell interference applicable at a particular time. The method can comprise the step of estimating an interference-and-noise sum $P_{other}(t_1)+P_N(t_1)$ based at least on a load utilization probability estimate $\hat{p}_{load}(t_0)$ and an interference-and-noise sum estimate $\hat{P}_{other}(t_0)+\hat{P}_N(t_0)$ applicable at a time $t_0$ to obtain an interference-and-noise sum estimate $\hat{P}_{other}(t_1)+\hat{P}_N(t_1)$ applicable at a time $t_1$, in which $t_1-t_0=T>0$. The method can further comprise the step of estimating an other cell interference $P_{other}(t_1)$ based at least on the interference-and-noise sum estimate $\hat{P}_{other}(t_1)+\hat{P}_N(t_1)$ and a thermal noise estimate $\hat{P}_N(t_1)$ to obtain an other cell interference estimate $\hat{P}_{other}(t_1)$ applicable at the time $t_1$.

Another non-limiting aspect of the disclosed subject matter is directed to a non-transitory computer-readable medium which has stored therein programming instructions. When a computer executes the programming instructions, the computer executes the method performed in a radio network node of a wireless network as described above for determining other cell interference applicable at a particular time.

Yet another non-limiting aspect of the disclosed subject matter is directed to a radio network node of a wireless network. The radio network node is structured to determine other cell interference applicable at a particular time. The radio network node can comprise a transceiver structured to transmit and receive wireless signals via one or more antennas from and to one or more cell terminals located within the cell of interest, a communicator structured to communicate with other network nodes, and a scheduler structured to schedule uplink transmissions from the cell terminals. The scheduler can also be structured to estimate an interference-and-noise sum $P_{other}(t_1)+P_N(t_1)$ based at least on the load utilization probability estimate $\hat{p}_{load}(t_0)$ and the interference-and-noise sum estimate $\hat{P}_{other}(t_0)+\hat{P}_N(t_0)$ to obtain an interference-and-noise sum estimate $\hat{P}_{other}(t_1)+\hat{P}_N(t_1)$ applicable at the time $t_1$. The scheduler can yet further be structured to estimate an other cell interference $P_{other}(t_1)$ based at least on the interference-and-noise sum estimate $\hat{P}_{other}(t_1)+\hat{P}_N(t_1)$ and a thermal noise estimate $\hat{P}_N(t_1)$ to obtain an other cell interference estimate $\hat{P}_{other}(t_1)$ applicable at the time $t_1$.

In these aspects, the load utilization probability $p_{load}(t)$ can express a relationships between radio resource grants scheduled to one or more cell terminals and radio resource grants used by the same cell terminals applicable at a time t. Each cell terminal can be a wireless terminal in the cell of interest, and $\hat{p}_{load}(t)$ can express an estimate of the load utilization probability $p_{load}(t)$. The interference-and-noise sum $P_{other}(t)+P_N(t)$ can express a sum of undesired signals, other than an own cell load $P_{own}(t)$, applicable at the time t, and $\hat{P}_{other}(t)+\hat{P}_N(t)$ can express an estimate of the interference-and-noise sum estimate $P_{other}(t)+P_N(t)$. The own cell load $P_{own}(t)$ can express a sum of signals due to wireless activities in the cell of interest. The other cell interference $P_{other}(t)$ can express a sum of interferences present in the cell of interest due to wireless activities applicable at the time t in one or more cells other than in the cell of interest, and $\hat{P}_{other}(t)$ can express an estimate of the other cell interference $P_{other}(t)$. A thermal noise $P_N(t)$ can express a sum of undesired signals present in the cell of interest at the time t other than the own cell load $P_{own}(t)$ and other than the other cell interference $P_{other}(t)$, and $\hat{P}_N(t_1)$ can express an estimate of the thermal noise $P_N(t)$. The interference-and-noise sum estimate $\hat{P}_{other}(t_1)+\hat{P}_N(t_1)$ and the other cell interference estimate $\hat{P}_{other}(t_1)$ may be based on a state space model comprising at least a measurement matrix $C(t_1)$.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

FIGS. 8 and 9 illustrate example flow diagrams of interference estimation in TD-scheduling operations;

DETAILED DESCRIPTION

Figure 1:
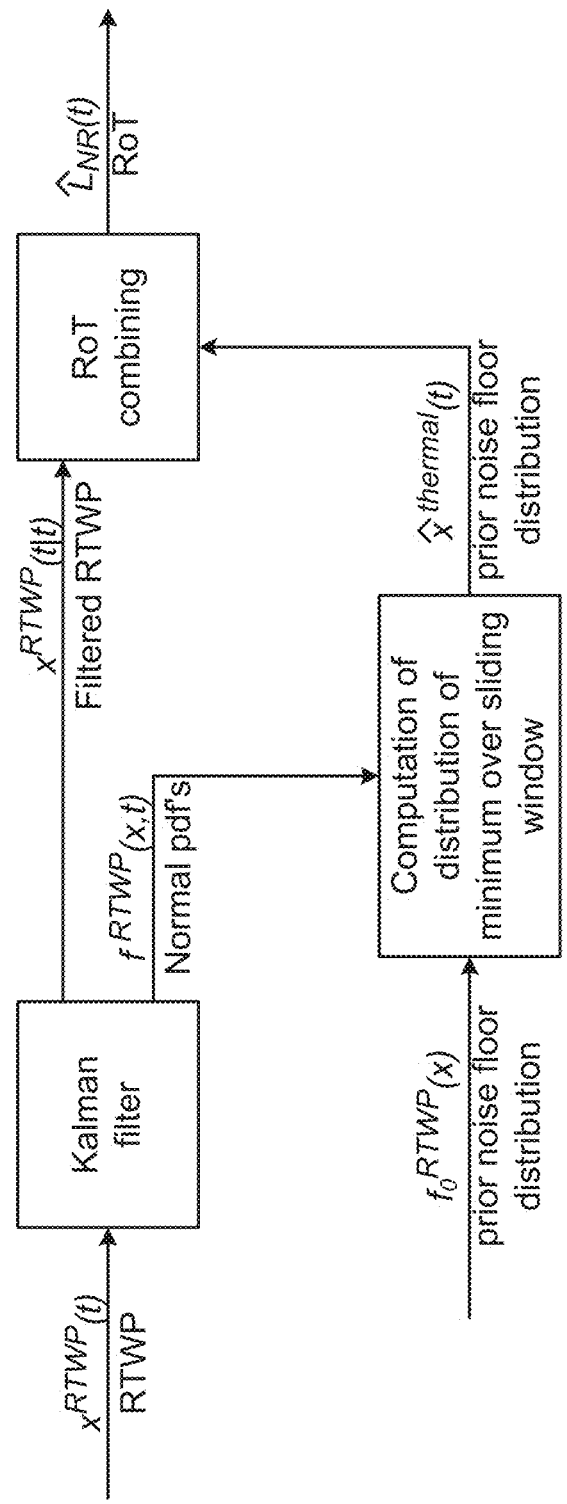
FIG. 1 illustrates a conventional algorithm that estimates a noise floor.
Figure 2:
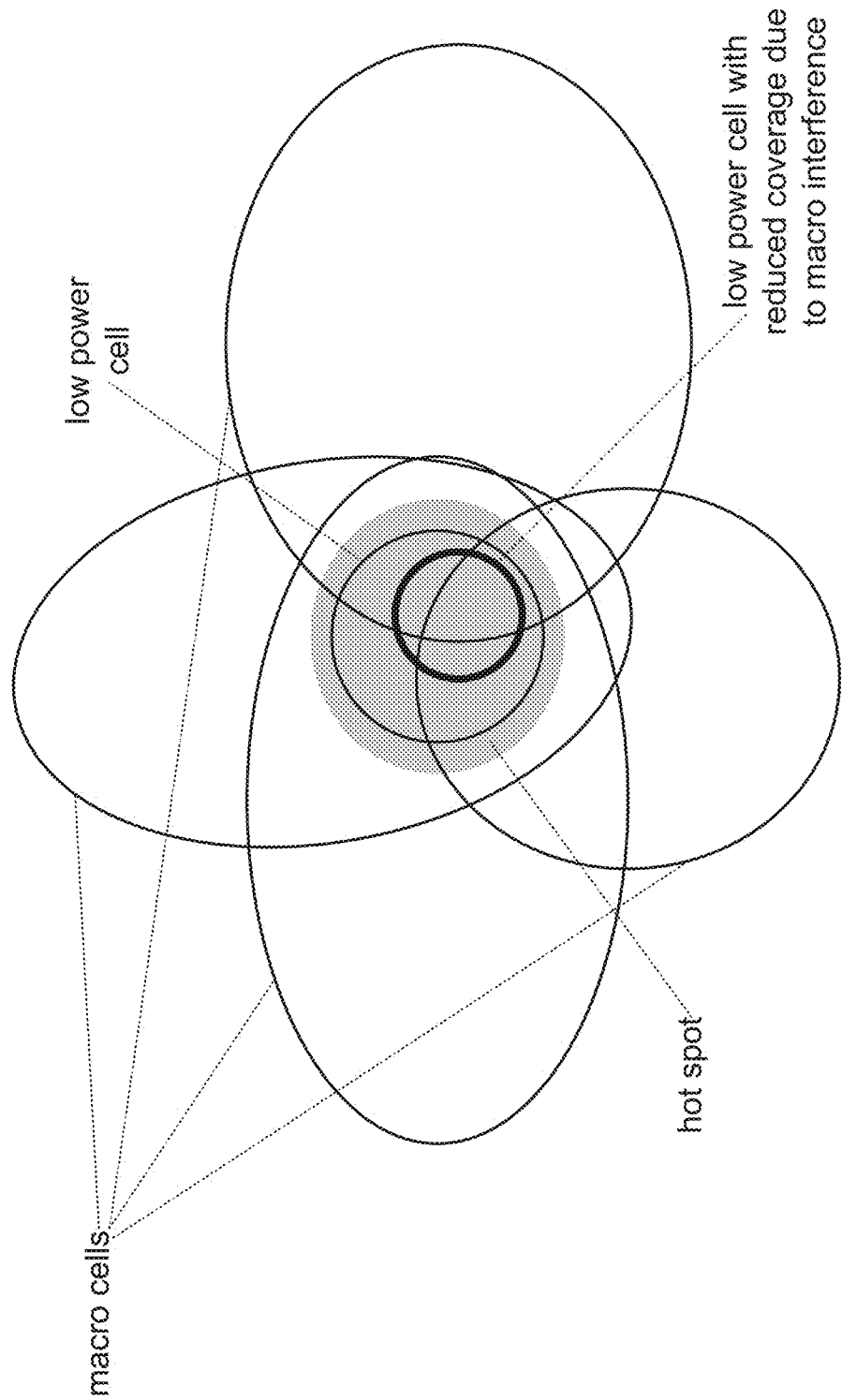
FIG. 2 illustrates an example scenario of a low power cell with limited coverage intended to serve a hotspot.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, LTE—are used as examples for explanation purposes. Note that the technology described herein can be applied to non-3GPP standards, e.g., WiMAX, cdma2000, 1xEVDO, etc. Thus, the scope of this disclosure is not limited to the set of 3GPP wireless network systems and can encompass many domains of wireless network systems. Also, a base station (e.g., RBS, NodeB, eNodeB, eNB, etc.) will be used as an example of a radio network node in which the described method can be performed. However, it should be noted that the disclosed subject matter is applicable to any node, such as relay stations, that receive wireless signals. Also without loss of generality, mobile terminals (e.g., UE, mobile computer, PDA, etc.) will be used as examples of wireless terminals that communicate with the base station.

As indicated above, one major disadvantage of many conventional RoT(t) estimation techniques is in the difficulty in separating the thermal noise $P_N(t)$ from the interference $P_{other}(t)$ from other cells. This makes it difficult to estimate the RoT(t), i.e., difficult to estimate the load as given in equation (1). The other cell interference $P_{other}(t)$ in this context may be viewed as a sum of interferences present in a cell of interest due to wireless activities applicable at time t in one or more cells other than in the cell of interest. In one or more aspects, the determination of the other cell interference $P_{other}(t)$ involves estimating the other cell interference. For the purposes of this disclosure, estimations of parameters are indicated with a "^" (caret) character. For example, $\hat{P}_{other}(t)$ may be read as an estimate of the other cell interference $P_{other}(t)$.

There are known techniques to determine the other cell interference estimate $\hat{P}_{other}(t)$. These conventional techniques assume that the powers of all radio links are measured in the uplink receiver. This assumption is not true in many instances today. The power measurement is associated with difficulties since:

In WCDMA for example, the uplink transmission is not necessarily orthogonal, which can cause errors when the powers are estimated; and The individual code powers are often small, making the SNRs (signal-to noise ratio) low as well. This further contributes to the inaccuracy of the power estimates.

One major problem associated with the conventional other cell interference estimation techniques is that the sum of other cell interference and thermal noise $P_{other}(t)+P_N(t)$ (referred to as the interference-and-noise sum) needs to be estimated through high order Kalman filtering. The primary reason is that all powers of the UEs need to be separately filtered using at least one Kalman filter state per UE when such techniques are used. This step therefore is associated with a very high computational complexity. There are techniques that can reduce this computational complexity, but the complexity can be still too high when the number of UEs increases. In these conventional solutions, the thermal noise floor N(t) is estimated as described above, i.e., $\hat{N}(t)$ is determined followed by a subtraction to arrive at an estimate of the other cell interference $\hat{P}_{other}(t)$.

Another problem with the conventional baseline RoT algorithm is that the front-end Kalman filter processes data in the linear power domain. This means that it is tuned for best operation at a signal level around −100 dBm. Even in the past this has not always been the case, due to strong in-band interference, e.g., from radar stations, and erroneous configuration and cell planning. The trend towards higher loads (high RoT), more traffic, more users together with HetNet network planning difficulties is very likely to drive signal levels up in many networks. Implication is that it would be very desirable to have a signal power level independent estimation of the RoT.

In the 3GPP release 99, the RNC controls resources and user mobility. Resource control in this framework may include admission control, congestion control, channel switching (roughly changing the data rate of a connection), etc. Furthermore, a dedicated connection is carried over a dedicated channel DCH, which is realized as a DPCCH (Dedicated Physical Control Channel) and a DPDCH (Dedicated Physical Data Channel).

In the evolved 3G standards, the trend is to decentralize decision making, and in particular the control over the short term data rate of the user connection. The uplink data is then allocated to E-DCH, which is realized as the triplet: a DPCCH, which is continuous, an E-DPCCH for data control and a E-DPDCH for data. The latter two are only transmitted when there is uplink data to send. Hence, the Node B uplink scheduler determines which transport formats each user can use over E-DPDCH. The RNC is however still responsible for admission control.

In the WCDMA uplink, there is a trade-off between coverage and enabled peak rates. This is even more emphasized with enhanced uplink, which supports higher bit rates than ordinary dedicated channels. The uplink resources are limited by the RoT that the cell can tolerate. The RoT limit can be motivated by coverage requirements or power control stability requirements. When only one user is connected in the cell, both power control stability and coverage are minor issues, since the uplink interference is likely to be dominated by the power generated by this user. In such a case, it may be tempting to allow a high RoT in order to allow high received signal relative interference powers, Ec/Io, which enables the use of high uplink bit rates. Conversely, in order to use the high uplink bit rates, the user connections have to provide high Ec/Io, which implies high RoT.

Figure 3A:
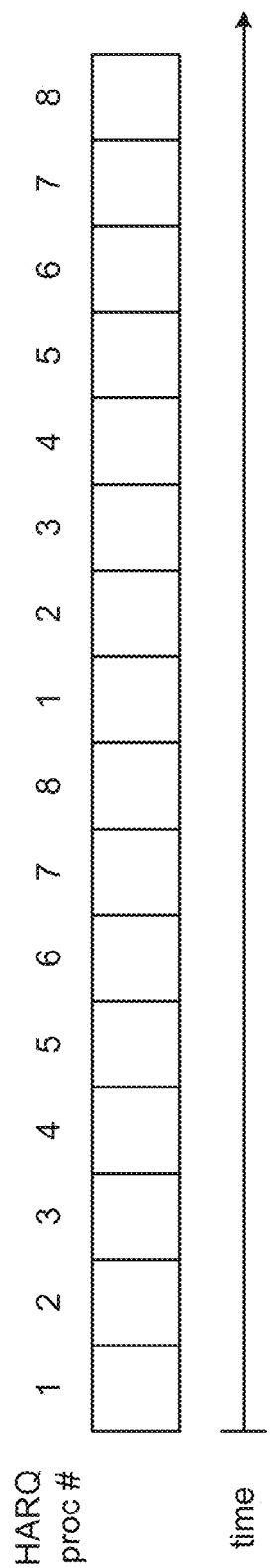
FIG. 3A illustrates an example of parallel HARQ processors scenario.

A data block is sent by the UE to the NodeB during a transmission time interval (TTI). For efficiency reasons, the received data blocks at the receiver are processed in parallel with M parallel processors taking turn to process data. While data block i is processed and decoding information is fed back to the transmitter, the receiver can start processing data blocks i, i+1, . . . etc. By the time when the receiver processor 1 has decoded the data block and fed back the decoding result, it is ready for processing either a retransmission of information related to the recently processed data or a new data block. By combining information both from the original data block and the retransmission, it is possible to correct errors in the reception. A retransmission scheme with both error correction and error detection is referred to hybrid ARQ or HARQ. Therefore, the M processors are often referred to as HARQ processors, each handling a data block received in a TTI. FIG. 3A depicts parallel HARQ processors for M=8.

Figure 3B:
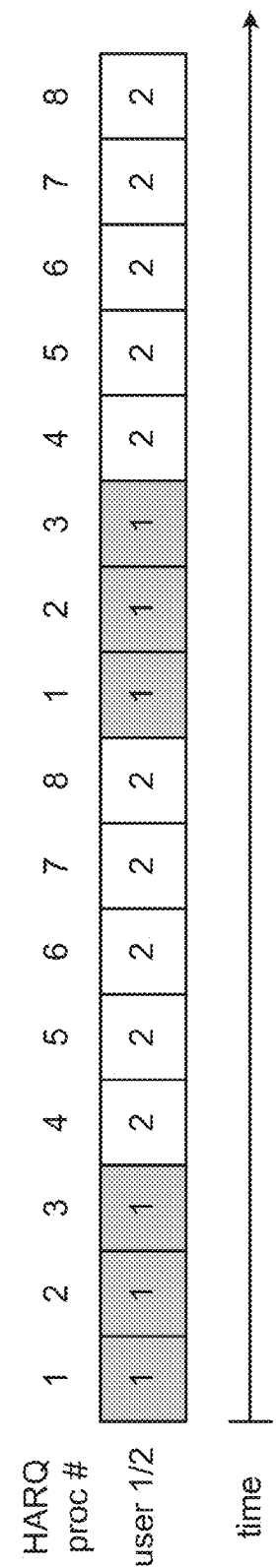
FIG. 3B illustrates an example of resource allocation in a TDM setting.

In order to orthogonalize the uplink user transmissions to a greater extent, it can be relevant to separate the user data transmissions in time, and employ a TDM (time division multiplex) scheme. It is possible to allocate grants to a user that is only valid for specified HARQ processes. This can be utilized to enable TDM for EUL. Furthermore, it allows retransmissions without interfering with other users, since retransmissions hit the same HARQ process as the original transmission. FIG. 3B provides an example of resource allocations in a TDM setting.

In the existing solutions, the EUL utilizes a scheduler that aims to fill the load headroom of the air interface, so that the different UE requests for bitrates are met. As stated above, the air-interface load in WCDMA is determined in terms of the noise rise over the thermal power level, i.e., the RoT(t), which is estimated at the base station.

Figure 3C:
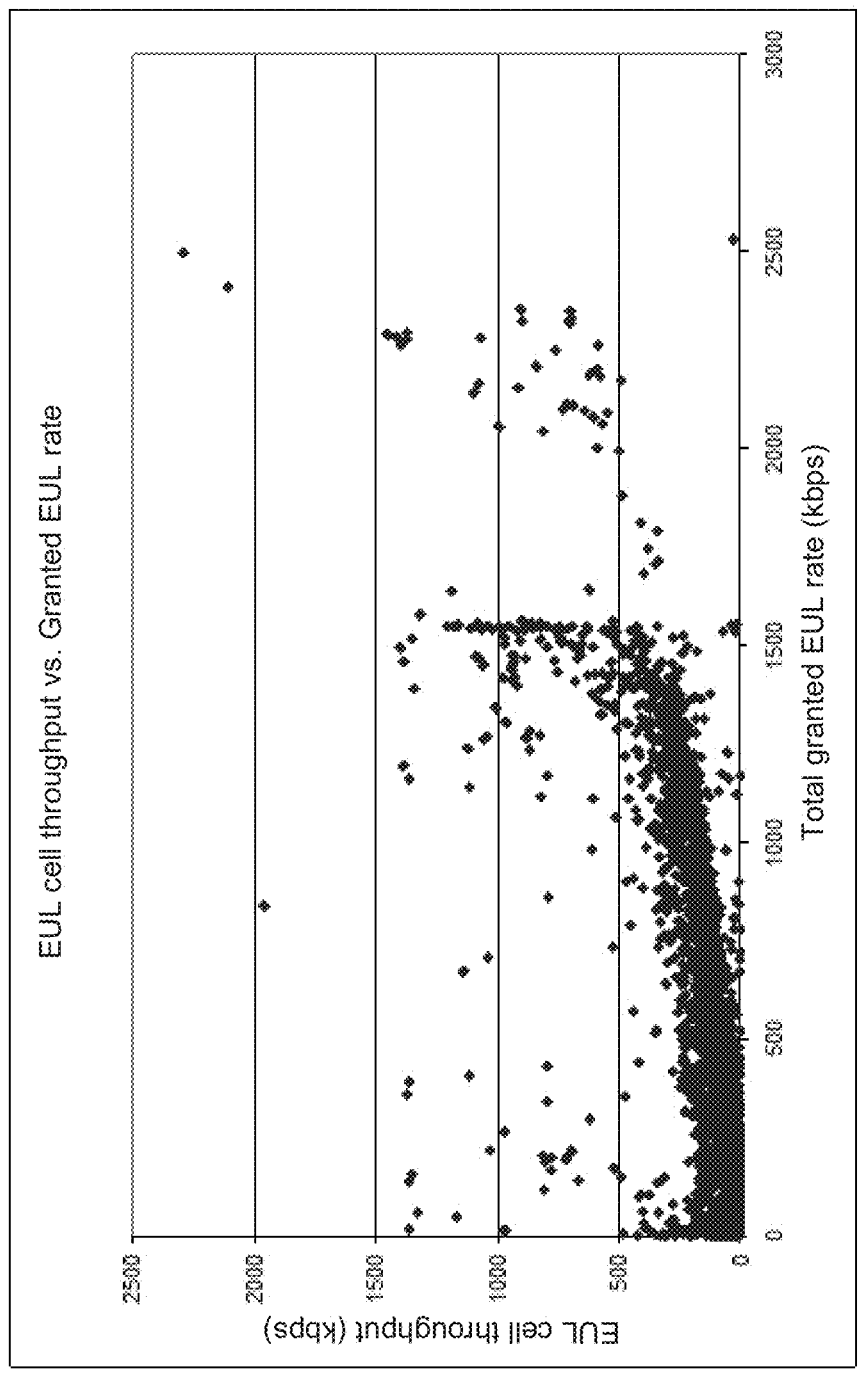
FIG. 3C illustrates a plot of a grant utilization probability.

When evaluating scheduling decisions, the scheduler predicts the load that results form the scheduled grants, to make sure that the scheduled load does not exceed the load thresholds for coverage and stability. This can be complicated since the grant given to a UE only expresses a limit on the UL power the UE is allowed to use. However, the UE may actually use only a portion of its grant. The conventional scheduler makes a worst case analysis, assuming that all UEs will use their grants at all times. But in reality, UEs in general have a relatively low utilization of grants. This is evident from field measurements as those depicted in FIG. 3C. The plot indicates a grant utilization of only about 25%. In other words, a significant amount (about 75%) of air-interface resources is wasted.

To summarize, there is a lack of technology that can estimate the other cell interference with sufficient accuracy (e.g., within 10-20%), sufficiently close in time (e.g., with close to TTI bandwidth) over the power and ranges of interest. There is also a lack of other cell interference estimation technology that accounts for a high bandwidth measured load utilization probability. A consequence is that it is not possible to make optimal scheduling decisions since the exact origin of the interference power in the UL is not known with a sufficient accuracy and bandwidth. This can lead to an inaccuracy of the load prediction step, where the scheduler bases its scheduling decision on a prediction of the resulting air interface load of the traffic it schedules. In TD setting, there is a lack of technology that can estimate interferences over an arbitrary subset of TD-slots.

Regarding HetNets in particular, problems associated with conventional scheduling techniques can be explained in a relatively straightforward manner. For scheduling in the base station in general, prior techniques require measurement of all UE powers in the UL. This is very costly computationally, requiring Kalman filters of high order for processing the measurements to obtain estimates of the other cell interference power. This is because each own cell UE adds a state to the Kalman filter. The consequence, if such estimation cannot be done, is that the scheduler is unaware of the origin of the interference, thereby making it more difficult to arrive at good scheduling decisions. For HetNets, the problem is again that there is no information of the origin of interference, and interference variance, for adjacent cells. This is primarily due to the lack of low complexity estimators for these quantities.

Each of one or more aspects of the disclosed subject matter addresses one or more of the issues related to conventional techniques. For example, recall from above that in conventional scheduling techniques, there is a delay of some number of TTIs from the scheduling decision until the interference power appears over the air interface. The scheduler also bases its scheduling decisions on a prediction of the load of the traffic it schedules. Since the UEs do not always utilize power granted by the scheduler, the load prediction are likely to be inaccurate. The inaccuracy tends to increase as the delay increases. To address this issue, in one or more aspects of the disclosed subject matter, measurements of momentary load utilization may be made and accounted for in the estimation of other cell interferences.

As another example, also recall that load prediction does not account for all imperfections in the modeling of the UL receiver. To address this issue, in one or more aspects of the disclosed subject matter, load factor bias may be estimated, e.g., when other cell interference is estimated.

A general concept applicable to one or more inventive aspects includes an algorithm to estimate other cell interferences. The algorithm may run in the RBS base band. The algorithm may be implemented any network node (e.g., RBS, RNC, CN, etc.) or any combination. An estimator implementing the other cell interference estimation algorithm may estimate the sum of all other cell interferences, experienced in the own cell context. The estimator, which can operate in a TD scheduling environment, may update other cell interference estimates and corresponding covariances for each of the TD slots in the subsets, based on any one or more of:

Measurements of total wideband power;
Measurements of load utilization probability;
Scheduled own cell load.

In an embodiment, the estimator may perform the update only for each of the TD slots in the subset. The estimator may also propagate (predict) other cell interference estimates and corresponding covariances are between each of the selected TD slots. This can be periodically repeated between TD slot occurrences that often repeat themselves with a period of 16 ms (equivalent to 8 HARQ processes). The estimator may utilize an extended Kalman filter (EKF) adapted for efficient processing in the TD environment.

The estimator applied for a selected set of TD slots may employ a UL nonlinear interference model, which can be responsive to:

a. a scheduled own cell load factor $L_{own}(t)$, an estimated load utilization probability $\hat{p}_{load}(t)$ (note the lower case "p"), an estimated sum of other cell interference and thermal noises $\hat{P}_{other}(t)+\hat{P}_N(t)$ (note the upper case "P"), and (optionally) an estimated load factor bias $\Delta \hat{L}_{own}(t)$, these quantities expressing an UL load curve relationship; or b. an estimated own cell load factor $\hat{L}_{own}(t)$, an estimated sum of other cell interference and thermal noise $\hat{P}_{other}(t)+\hat{P}_N(t)$ and (optionally) an estimated load factor bias $\Delta \hat{L}_{own}(t)$, these quantities expressing an UL load curve relationship.

The estimator can be responsive to:

a. a measured total wideband power $y_{RTWP}(t)$, a measured load utilization probability $p_{load}(t)$ a received uplink own cell load factor $\overline{L}_{own}(t)$, and the UL nonlinear interference model; or b. a measured total wideband power $y_{RTWP}(t)$, a measured own cell load factor $\overline{L}_{own}(t)$, and the UL nonlinear interference model.

The estimator can also be responsive to a dynamic model for propagation of the estimated states. The estimated states can include:

a. the estimated sum of other cell interference and thermal noise $\hat{P}_{other}(t)+\hat{P}_N(t)$, the estimated load utilization probability $\hat{p}_{load}(t)$, (optionally) the estimated load factor bias $\Delta \hat{L}_{own}(t)$ and at least one delay line state; or b. the estimated sum of other cell interference and thermal noise $\hat{P}_{other}(t)+\hat{P}_N(t)$, the estimated own cell load factor $\hat{L}_{own}(t)$, (optionally) the estimated load factor bias $\Delta \hat{L}_{own}(t)$ and at least one delay line state.

The estimator can further be responsive to an estimated thermal noise $\hat{P}_N(t)$, and provide an estimated other cell interference $\hat{P}_{other}(t)$. For example, the other cell interference estimate $\hat{P}_{other}(t)$ may be arrived at by subtracting the thermal noise estimate $\hat{P}_N(t)$ from the interference-and-noise sum estimate $\hat{P}_{other}(t)+\hat{P}_N(t)$.

In the discussion above, the values of parameters are "estimated", "measured", "received" or "computed". A measured value in essence can be viewed a number that expresses a value of a measured quantity. An estimated value is not a number that expresses a value of a measurement, at least not directly. Rather, an estimate can be viewed as a processed set of measurements, e.g., by some filtering operation. There can also be received and/or computed quantities, such as time varying parameters that are obtained from other sources. It is stressed that measured or estimated quantities can be very different, also in case the measured and estimated quantity refer to the same underlying physical quantity, e.g., a specific power. One among many reasons for this is that the processing to obtain estimates e.g., may combine measurements from different times to achieve e.g., noise suppression and bias reduction.

Also in the discussion above, "a" and "b" represent alternatives. In the discussion below, alternative "a" will be described in detail, and some comments on the difference between the alternative will be provided.

As will be demonstrated below, one very significant advantage of the inventive estimator is its low order and associated low computational complexity. In one embodiment, the estimator can be a variant of an extended Kalman filter (EKF), arranged for processing using the nonlinear interference model. One or more of the inventive aspects can be applied to one or both of the sliding window and recursive RoT estimation algorithms. Either SIR or power based load factor calculation may be used.

Recall from the discussion regarding HetNets that the surrounding macro cells can interfere with the low power cell to levels such that the UEs of the hotspot are actually connected to the macro cells. To address such issues, in one or more aspects of disclosed subject matter, RNC (radio network controller) or the surrounding RBSs can be informed of the interference situation and can take action as appropriate. For example, admission control in the RNC or functionalities in the surrounding RBSs can be used to reduce the other cell interference and provide better management of the hot spot traffic, e.g., in terms of air interface load. To enable this to take place, the RBS can include capabilities to estimate the other cell interference.

Figure 4:
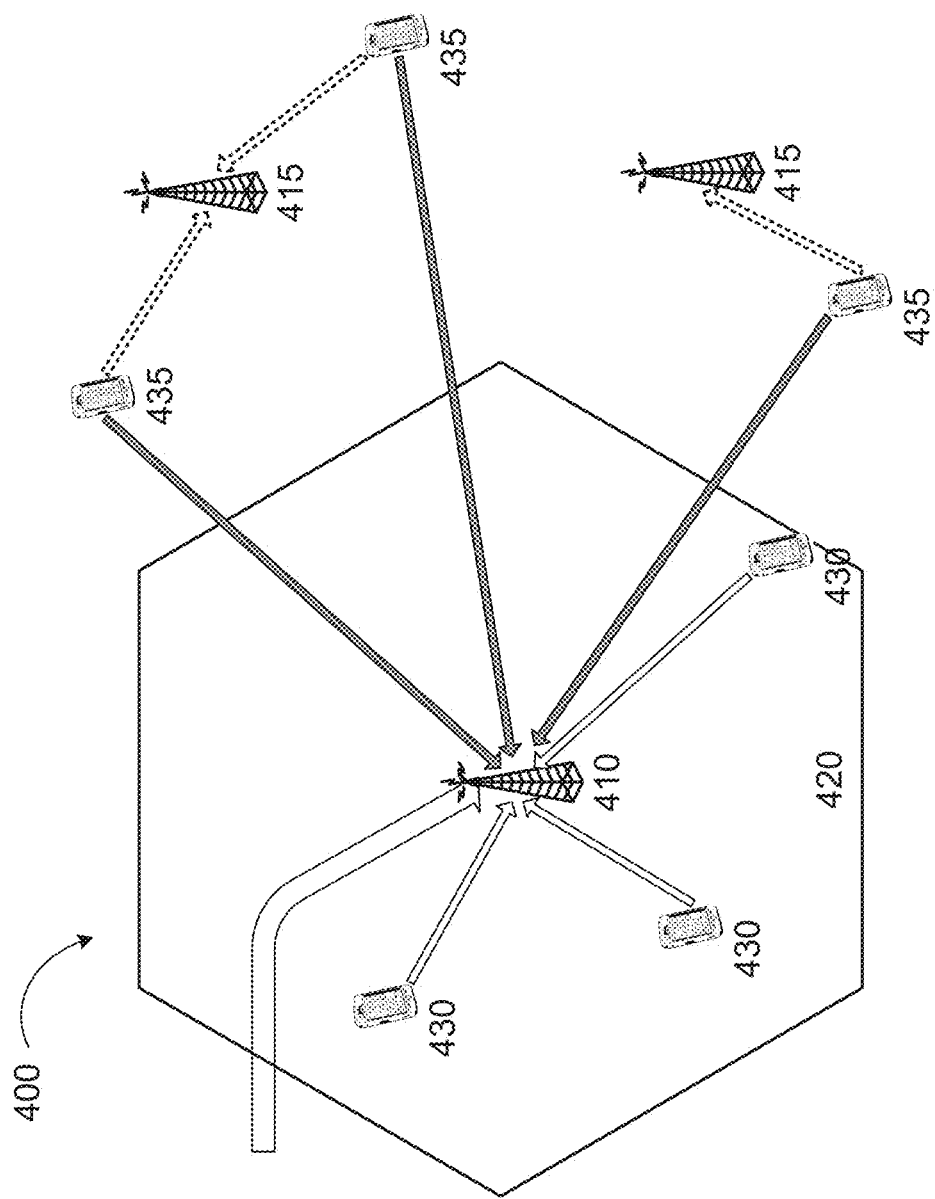
FIG. 4 illustrates an example scenario in which other cell interference is determined.

FIG. 4 illustrates an example scenario in which a radio network node 410 (e.g., eNB, eNode B, Node B, base station (BS), radio base station (RBS), and so on) can estimate the other cell interference. In the figure, the radio network node 410 serves one or more wireless terminals 430 (e.g., user equipment, mobile terminal, laptops, M2M (machine-to-machine) terminals, etc.) located within a corresponding cell 420. For clarity, the radio network node 410 will be referred to as an own radio network node, the cell 420 will be referred to as the cell of interest, and the terminals 430 within the cell of interest 420 will be referred to as own terminals. Uplink signaling and data traffic from the own terminals 430 to the own radio network node 410 are illustrated as solid white arrows.

The scenario in FIG. 4 also includes other radio network nodes 415 serving other wireless terminals 435 as indicated by dashed white arrows. When the other terminals 435 transmit to their respective other radio network nodes 415, these signals are also received in the own radio network node 410 as indicated by shaded solid arrows. Such signals act as interferers within the cell of interest 420. A sum of powers of these interfering signals experienced at the own radio network node 410 at time t will be denoted as $P_{other}(t)$. In other words, the other cell interference $P_{other}(t)$ may be viewed as expressing a sum of interferences present in the cell of interest due to wireless activities applicable at time t in one or more cells other than in the cell of interest 420. Further, there is a large solid white arrow with no particular source. This represents the thermal noise $P_N(t)$ experienced in the own radio network node 410 of the cell of interest 420 at time t.

Figure 5:
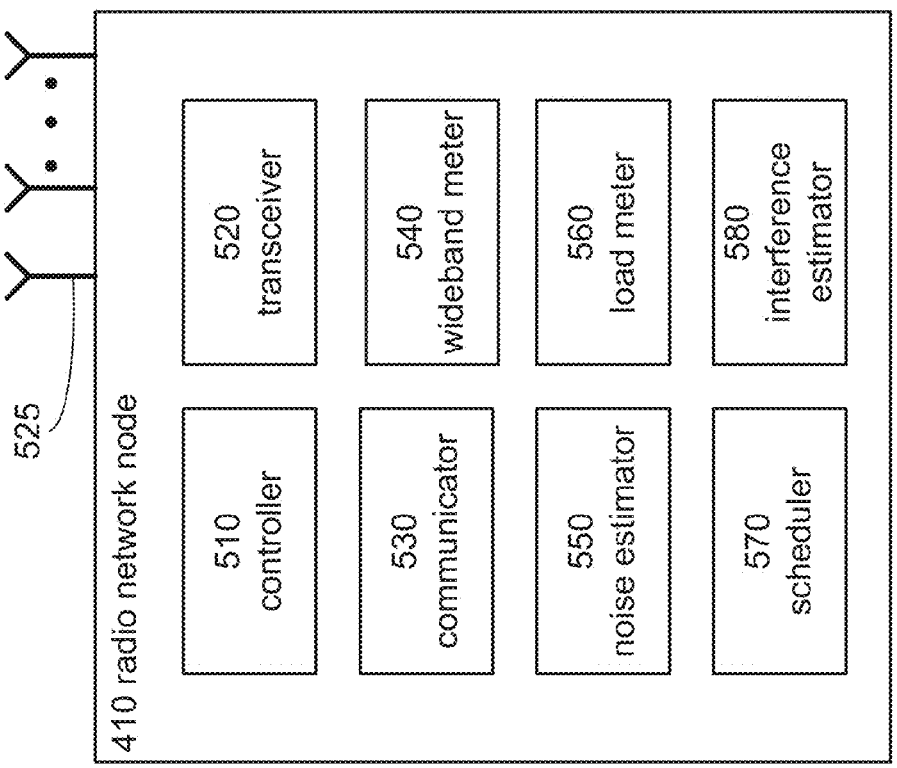

FIG. 5 illustrates an example embodiment of a radio network node 410. The radio network node 410 may comprise several devices including a controller 510, a transceiver 520, a communicator 530, a wideband meter 540, a noise estimator 550, a load meter 560, a scheduler 570, and an interference estimator 580. The transceiver 520 may be structured to wirelessly communicate with wireless terminals 430. The communicator 530 may be structured to communicate with other network nodes and with core network nodes. The wideband meter 540 may be structured to measure a total wideband power received at the radio network node 410. The noise estimator 550 may be structured to estimate and/or predict the thermal noise at the radio network node 410. The load meter 560 may be structured to determine load utilization. The scheduler 570 may be structured to schedule resource grants for use by the wireless terminals 430. The interference estimator 580 may be structured to estimate and/or predict external interferences experienced at the radio node 410. The controller 510 may be structured to control the overall operations of the radio network node 410.

Figure 6:
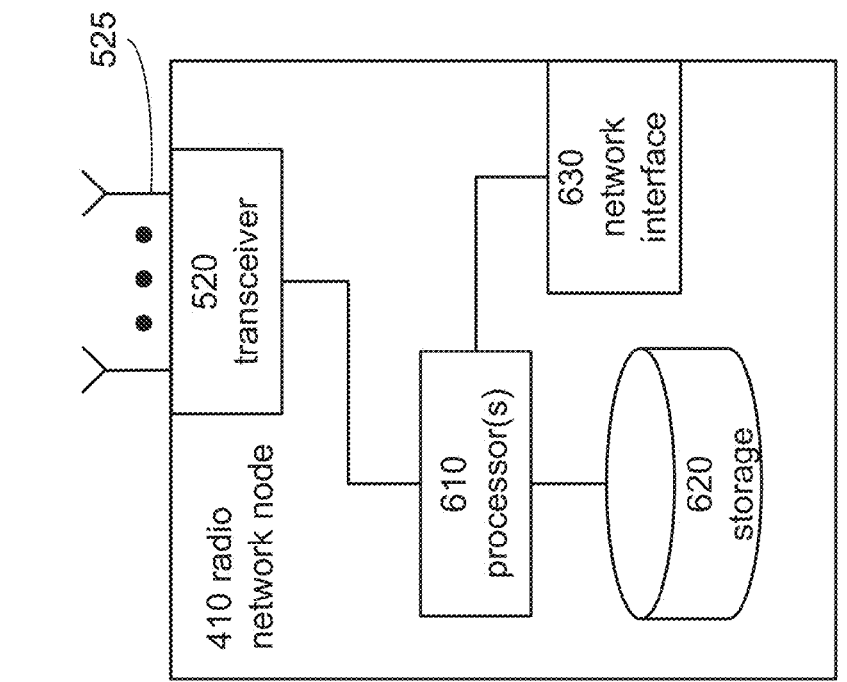
FIGS. 5, 6 and 7 respectively illustrate example embodiments of a radio network node.

FIG. 5 provides a logical view of the radio network node. It is not strictly necessary that each device be implemented as physically separate modules or circuits. Some or all devices may be combined in a physical module. Also, one or more devices may be implemented in multiple physical modules as illustrated in FIG. 6.

The devices of the radio network node 410 as illustrated in FIG. 5 need not be implemented strictly in hardware. It is envisioned that any of the devices may be implemented through a combination of hardware and software. For example, as illustrated in FIG. 6, the radio network node 410 may include one or more central processing units 610 executing program instructions stored in a storage 620 such as non-transitory storage medium or firmware (e.g., ROM, RAM, Flash) to perform the functions of the devices. The radio network node 410 may also include a transceiver 520 structured to receive wireless signals from the wireless terminals 430 and to send signals to the wireless terminals 430 over one or more antennas 525 in one or more channels. The radio network node 410 may further include a network interface 630 to communicate with other network nodes such as the core network nodes.

Figure 7:
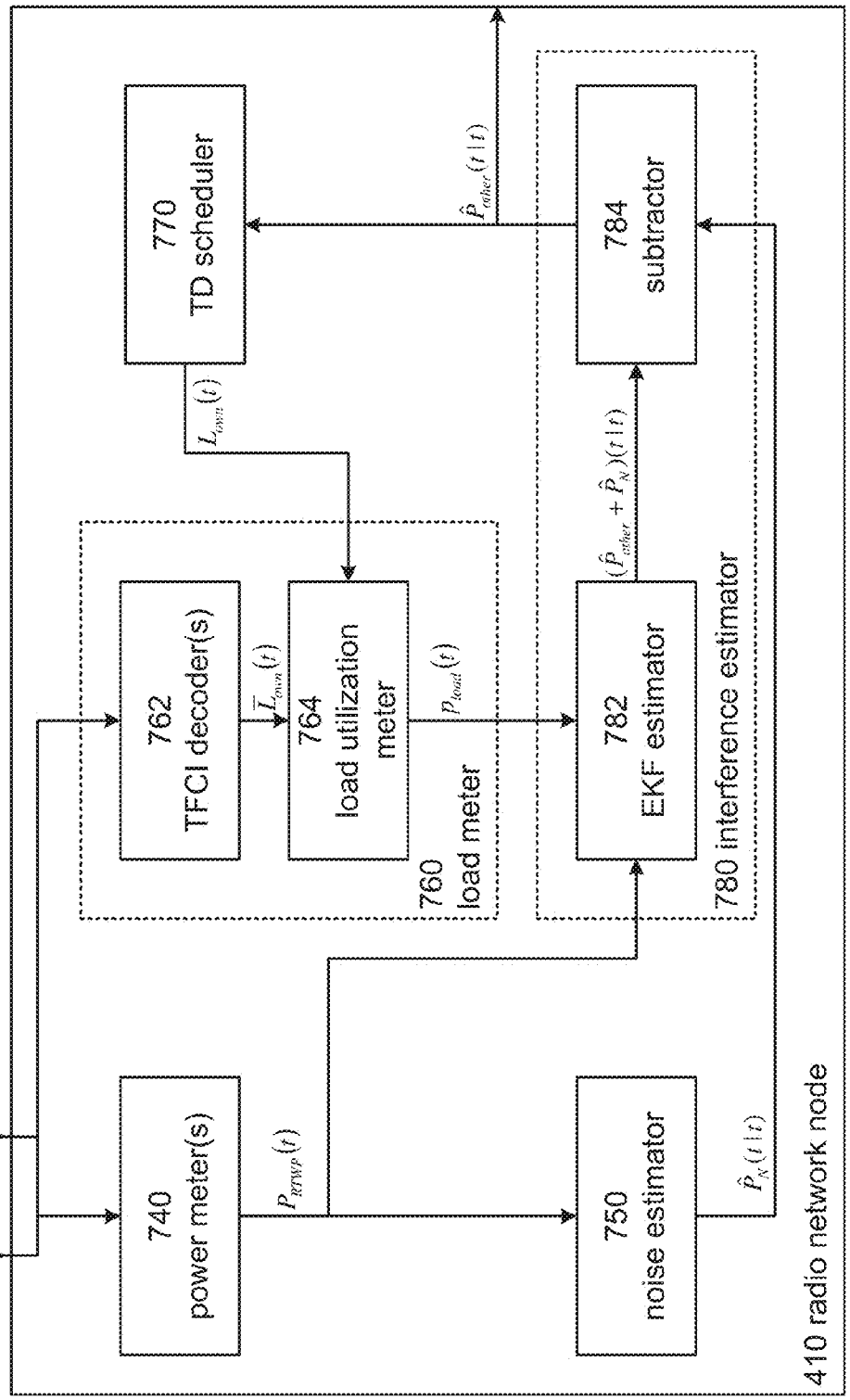

FIG. 7 illustrates another example of a of a radio network node other interference estimation in the TD. This may be viewed as a particular implementation of the radio network node 410 illustrated of FIG. 5. Thus, like the node 410 of FIG. 5, the devices of illustrated in FIG. 7 may be implemented through a combination of hardware and software. The radio network node 410 may comprise several devices including a wideband meter 740, a noise estimator 750, a load meter 760, a scheduler 770, and an interference estimator 780. The wideband meter 710 may be structured to measure the total wideband power $P_{RTWP}(t)$ experienced at the antennas 525. The wideband meter 710 may comprise one or more power meters. For example, power at each antenna port may be measured. The noise estimator 750 may be structured to provide the thermal noise estimate $\hat{P}_N(t)$. In one embodiment, the noise estimator 750 may provide the noise floor estimate $\hat{N}(t)$ as the thermal noise estimate $\hat{P}_N(t)$.

The load meter 760 may be structured to measure or otherwise determine the measured own load factor $\overline{L}_{own}(t)$, i.e., the amount of scheduled grants actually utilized by the UEs corresponding to the cell. The load meter 760 may also be structured to calculate or otherwise determine the load utilization probability $p_{load}(t)$. In one embodiment, the load meter 760 may comprise a load factor meter 762 and a load utilization meter 764. The load factor meter 762 may be structured to measure the own load factor $\overline{L}_{own}(t)$ based on signals received at the antennas 525, In an embodiment, the load factor meter 762 may comprise one or more TFCI and/or E-TFCI decoders. The load utilization meter 764 may be structured to calculate or otherwise determine the load utilization probability $p_{load}(t)$ based on the measured own load factor $\overline{L}_{own}(t)$ and the scheduled own cell load factor $L_{own}(t)$.

The scheduler 770 may be structured to schedule grants of communication resources for use by the UEs, i.e., determine the scheduled own cell factor $L_{own}(t)$. In an embodiment, the scheduler 770 may schedule TDM grants based on the other cell interference $\hat{P}_{other}(t)$ predicted by the interference estimator 780.

The interference estimator 780 may be structured to estimate or otherwise determine undesired signals experienced at the radio network node 410, which includes the interference-and-noise sum estimate $\hat{P}_{other}(t)+\hat{P}_N(t)$ and/or the other cell interference estimate $\hat{P}_{other}(t)$. In an embodiment, the interference estimator 780 may comprise an interference-and-noise estimator 782 and an other cell interference estimator 784. The interference-and-noise estimator 782 may be structured to estimate or otherwise obtain the interference-and-noise sum estimate $\hat{P}_{other}(t)+\hat{P}_N(t)$. The interference-and-noise estimator 782 may be implemented as an EKF estimator. The other cell interference estimator 784 may be structured to estimate or otherwise obtain the other cell interference estimate $\hat{P}_{other}(t)$. The other cell interference estimator 784 may subtract the thermal noise estimate $\hat{P}_N(t)$ from the interference-and-noise sum estimate $\hat{P}_{other}(t)+\hat{P}_N(t)$.

In one or more aspects, the radio network node 410 can be structured to implement a high performing estimator. The inventive estimator can perform a joint estimation of $P_{other}(t)+P_N(t)$, $P_N(t)$, $P_{other}(t)$ (note the upper case "P") and the load utilization probability $p_{load}(t)$ (note the lower case "p"). An extended Kalman filter (EKF) can be used in one or more embodiments of the proposed estimator. One EKF may be used for each selected subset of TD slots. In this context, a subset may be determined as a union of the TD slots that schedule exactly the same set of UEs in EUL. This can allow for a more slowly varying own cell load factor than would otherwise be the case, a fact that can enhance the estimation accuracy.

Note that the description of the estimator provided below is for one instance of an example other cell interference estimation algorithm. There may be multiple instances, e.g., up to 8, that may be running parallel for each set of HARQ processors. The proposed estimator can use any one or more of the following information:

Measurements of $P_{RTWP}(t)$, with a sampling rate of $T_{RTWP}=k_{RTWP}TTI$, $k_{RTWP}\in Z+$. For example, $T_{RTWP}=2$ ms. Preferably, the measurements are available for each antenna branch.

Computed load factors $L_{own}(t)$, with a sampling rate of $T_L=k_LTTI$, $k_L\in Z+$. Preferably, the load factors are available per cell and are valid on cell level. They need not necessarily be valid on antenna branch level with Rx diversity. $L_{own}(t)$ may include or incorporate the combined effect of R99, EUL 10 ms, EUL 2 ms and TD scheduled traffic. In an example, $T_L=2$ ms The loop delay $T_D$ between the calculation of $L_{own}(t)$, and the time it takes effect on the air interface. The loop delay may be dependent on the TTI. Preferably, the loop delay is available for and valid per cell.

Measured load factors $\overline{L}_{own}(t)$, with a sampling rate of $T_{\overline{L}}=k_{\overline{L}}TTI$, $k_{\overline{L}}\in Z+$. Preferably, the load factors are available per cell, and valid on the cell level. They need not necessarily be valid on the antenna branch level with Rx diversity. The factors can be obtained after TFCI decoding. $\overline{L}_{own}(t)$ may include or incorporate the combined effect of R99, EUL 10 ms, EUL 2 ms and TD scheduled traffic. In an example, $T_{\overline{L}}=2$ ms The loop delay $\overline{T}_D$ between the calculation of $\overline{L}_{own}(t)$, and the time it takes effect on the air interface. The loop delay can be dependent on the TTI and larger than $T_D$ since the measured load factor calculation may necessitate TFCI and E-TFCI decoding.

For adaptation to extended Kalman filtering, the following states are modeled:

$$x_1(t)=p_{load}(t)\text{-load utilization probability at time }t, \quad (12)$$

$$x_2(t)=P_{other}(t)+P_N(t)\text{-interference-and-noise sum at time }t, \quad (13)$$

$$x_3(t)=\Delta\overline{L}_{own}(t)\text{-load factor bias at time }t, \quad (14)$$

$$x_4(t)=x_1(t-T)\text{-decoding delay incorporated.} \quad (15)$$

Modeling in one aspect may be viewed as a form of state space modeling in which state space of a physical system is mathematically modeled as a set of input, output and state variables related by equations.

Since an additional decoding delay affects the loop, the first state $x_1(t)$ may be delayed by an extra state to define the fact that the load utilization probability measurement is subject to an additional delay T for decoding. The fourth state $x_4(t)$ can be used for this purpose. The delay T can any positive integer multiple of the TTI. Typically the delay T is substantially equal to one TTI. In the equations for the states, $\Delta L_{own}(t)$ represents a slowly varying load factor bias error in the measurement model.

In alternative "b", the estimated own cell load factor $L_{own}(t)$ may be introduced as the first state $x_1(t)$.

In the inventive nonlinear model, various measurements can be made available for processing. First of these is the total wideband power $P_{RTWP}(t)$. Note that the scheduled load of the own cell $L_{own}(t)$ is a computed quantity (e.g., based on SINR measurements). For this reason, it is advantageous to provide a measurement model of $P_{RTWP}(t)$, expressed in terms of the states, computed quantities and a measurement uncertainty. Towards this end, first note that the load in equation (6) does not account for the load utilization probability $p_{load}(t)$. Also, it does not account for the delay $T_D$. Again, it is emphasized that $L_{own}(t)$ can be expected to be quite slowly varying for each selected subset of slots with the same UEs. This can be a significant factor in enhancing the estimator performance by a less aggressive tuning in terms of bandwidth.

To model the load utilization effect, and to compensate for semi-constant load factor errors, a review of equation (5) suggests that load underutilization can be modeled by a modification of (5) and (6) as:

$$L_{own,utilized}(t) = \sum_{i=1}^{I} p_{load}(t) L_i(t - T_D) + \Delta \bar{L}_{own}(t) = \qquad (16)$$

$$p_{load}(t) L_{own}(t - T_D) + \Delta \bar{L}_{own}(t),$$

$$P_{RTWP}(t) = L_{own,utilized}(t) P_{RTWP}(t) + P_{other}(t) + P_N(t) \qquad (17)$$

which results in $$P_{RTWP}(t) = \frac{1}{1 - L_{own}(t - T_D) p_{load}(t) + \Delta \bar{L}_{own}(t)} (P_{other}(t) + P_N(t)). \qquad (18)$$

After an addition of a zero mean white measurement noise $e_{RTWP}(t)$ and replacement of variables by the states of (12)-(15), the following nonlinear measurement equations result:

$$y_{RTWP}(t) = \frac{x_2(t)}{1 - L_{own}(t - T_D) x_1(t) + x_3(t)} + e_{RTWP}(t), \qquad (19)$$

$$R_{2,RTWP}(t) = E[e_{RTWP}^2(t)]. \qquad (20)$$

In (19) and (20), $y_{RTWP}(t) = P_{RTWP}(t)$ and $R_{2,RTWP}(t)$ denotes the (scalar) covariance matrix of $e_{RTWP}(t)$. If the load of the own cell is computed using both EUL and R99 traffic, the delay can be valid for both. If the own cell load is estimated instead, $L_{own}(t-T_D) x_1(t)$ can be expressed by a state directly modeling the estimated load factor of the own cell. The own cell load factor appearing in (19) can be treated as a known time varying factor, not as an estimate.

Note that (19) can represent a nonlinear load curve, expressed in terms of the estimated load utilization probability ($x_1(t)$), the estimated sum of neighbor cell interference and thermal noise power ($x_2(t)$) and the estimated load factor bias ($x_3(t)$). That is, (19) can represent a nonlinear curve expressed in terms of $\hat{x}_1(t)$, $\hat{x}_2(t)$ and $\hat{x}_3(t)$. Further the computed ("received") load factor can be used in the nonlinear load curve. Equation (19) can be said to relate the momentary combined effect of the estimated quantities and received quantities to the left hand side of the equation, i.e. the momentary measurement of the wideband power. Note that in one or more embodiments, the thermal noise floor N(t) can be used to represent the thermal noise $P_N(t)$ and the thermal noise floor estimate $\hat{N}(t)$ can be used to represent thermal noise estimate $\hat{P}_N(t)$ in these equations.

Measurement of the load utilization probability $p_{load}(t)$ can be made available per cell. As an example, the decoded TFCIs and E-TFCIs show which grants the wireless terminal 430 actually used in the last TTI. This provides the information needed to compute the actual load factor of the last TTI, i.e. to compute:

$$p_{load}(t) = \frac{\bar{L}_{own}(t - T_D)}{L_{own}(t - T_D)}. \qquad (21)$$

With such modification, the measurement model for the load utilization probability measurement becomes:

$$y_{loadUtilization}(t) = x_4(t) + e_{loadUtilization}(t), \qquad (22)$$

$$R_{2,loadUtilization}(t) = E[e_{loadUtilization}(t)]^2. \qquad (23)$$

The transformation (21) can be view as essentially replacing the granted load factor, $L_{own}(t-T_D)$, with the load factor computed based on the received TFCIs and E-TFCIs, In the dynamic state model, random walk models can be adapted for the first and second state variables $x_1(t)$ and $x_2(t)$. In order to avoid a drifting bias correction of the load factor, an autoregressive model can be used for the third state $x_3(t)$. A further motivation for this is that the state can be expected to model errors that over an ensemble has a zero mean. Hence the following state model can result from the states of (12)-(15).

$$x(t+T) \equiv \begin{pmatrix} x_1(t+T) \\ x_2(t+T) \\ x_3(t+T) \\ x_4(t+T) \end{pmatrix} = \begin{pmatrix} 1 & 0 & 0 & 0 \\ 0 & 1 & 0 & 0 \\ 0 & 0 & a & 0 \\ 1 & 0 & 0 & 0 \end{pmatrix} \begin{pmatrix} x_1(t) \\ x_2(t) \\ x_3(t) \\ x_4(t) \end{pmatrix} + \begin{pmatrix} w_1(t) \\ w_2(t) \\ w_3(t) \\ w_4(t) \end{pmatrix} \qquad (24)$$

$$R_1(t) = E\left[\begin{pmatrix} w_1(t) \\ w_2(t) \\ w_3(t) \\ w_4(t) \end{pmatrix} (w_1(t) \; w_2(t) \; w_4(t) \; w_4(t))\right]. \qquad (25)$$

Preferably, the delay T equals one TTI, but can be any positive integer multiple of the TTI. Note that by setting a=1, a random walk model can be obtained for all states. A diagonal covariance matrix can be used. The last component of the system noise is preferably selected to be very small, reflecting the pure delay it is intended to model.

A general state space model behind the EKF can be expressed as follows:

$$x(t+T) = A(t)x(t) + B(t)u(t) + w(t). \qquad (26)$$

$$y(t) = c(x(t)) + e(t). \qquad (27)$$

Here x(t) denotes a state vector, u(t) denotes an input vector (not used in the inventive filtering), y(t) denotes an output measurement vector comprising power measurements performed in a cell (i.e., the total received wideband power $P_{RTWP}(t)$), w(t) denotes the so called systems noise that represent the model error, and e(t) denotes the measurement error. The matrix A(t) is a system matrix describing the dynamic modes, the matrix B(t) is the input gain matrix, and the vector c(x(t)) is the, possibly nonlinear, measurement vector which is a function of the states of the system. Finally, t represents the time and T represents the sampling period.

The general case with a nonlinear measurement vector is considered here. For this reason, the extended Kalman filter should be applied. This filter is given by the following matrix and vector iterations $$
\begin{aligned}
&\text{Initialization:} \\
&\quad t = t_0 \\
&\quad \hat{x}(0 \mid -1) = x_0 \\
&\quad P(0 \mid -1) = P_0 \\
&\text{Iteration over } t \\
&\quad t = t + T \\
&\quad C(t) = \left. \frac{\partial c(x)}{\partial x} \right|_{x = \hat{x}(t \mid t - T)} \\
&\quad K_f(t) = P(t \mid t - T) C^T(t) (C(t) P(t \mid t - T) C^T(t) + R_2(t))^{-1} \\
&\quad \hat{x}(t \mid t) = \hat{x}(t \mid t - T) + K_f(t)(y(t) - c(\hat{x}(t \mid t - T))) \\
&\quad P(t \mid t) = P(t \mid t - T) - K_f(t) C(t) P(t \mid t - T) \\
&\quad \hat{x}(t + T \mid t) = A \hat{x}(t \mid t) + B u(t) \\
&\quad P(t + T \mid t) = A P(t \mid t) A^T + R_1(t). \\
&\text{End.}
\end{aligned}
\tag{28}
$$

The quantities introduced in the filter iterations (28) are different types of estimates ($\hat{x}(t|t-T)$, $\hat{x}(t|t)$, $P(t|t-T)$, and $P(t|t)$), function of such estimates ($C(t)$ and $K_f(t)$), or other quantities ($R_2(t)$ and $R_1(t)$), defined as follows:

$\hat{x}(t|t-T)$ denotes a state prediction, based on data up to time $t-T$, $\hat{x}(t|t)$ denotes a filter update, based on data up to time $t$, $P(t|t-T)$ denotes a covariance matrix of the state prediction, based on data up to time $t-T$, $P(t|t)$ denotes a covariance matrix of the filter update, based on data up to time $t$, $C(t)$ denotes a linearized measurement matrix (linearization around the most current state prediction), $K_f(t)$ denotes a time variable Kalman gain matrix, $R_2(t)$ denotes a measurement covariance matrix, and $R_1(t)$ denotes a system noise covariance matrix.

Note that $R_1(t)$ and $R_2(t)$ are often used as tuning variables of the filter. In principle, the bandwidth of the filter can be controlled by the matrix quotient of $R_1(t)$ and $R_2(t)$.

To describe the example modifications made in the EKF, it is first assumed that one instance of the EKF is allocated to the subset of HARQ processes that is associated with the set of times $T_{HARQ,K}$, where K is a number between 1 and the number of subsets of TD-slots. For example, there may be up to 8 subsets of TD-slots since the WCDMA EUL standard includes 8 HARQ processes. During the TTIs of one HARQ process of $T_{HARQ,K}$, processing may be performed as usual with updates and propagations. But preferably for TTIs outside any of the time slots of HARQ processes in $T_{HARQ,K}$, no measurements are to be processed. The state vector and the covariance matrix do however need to be propagated to the next TTI where the specific HARQ process becomes active.

In the context of TD scheduling operation, there are alternative ways to estimate the other interferences. In a first alternative, the EKF may be run as usual, the equations (28) and (31)-(35) (described further below) by setting:

$$
C(t) = \begin{cases} 0, & \mathrm{mod}(t, t_{HARQ,k}) \neq 0, \\ \left. \frac{\partial c(x)}{\partial x} \right|_{x=\hat{x}(t|t-T)} & \mathrm{mod}(t, t_{HARQ,k}) = 0 \end{cases},
\tag{29}
$$

$t_{HARQ,k} \in T_{HARQ,K}$,

A flow diagram of the first alternative is illustrated FIG. 8. This flow diagram reflects the filter iterations of (28), but with the linearized measurement matrix C(t) set according to (29). The effect is that measurement update is automatically stopped for TTIs outside of the HARQ processes. The apparatuses illustrated in FIGS. 5 and 7 may perform the first alternative. For example, if HARQ is active (if mod(t,$t_{HARQ,k}$)=0 in step 830), the interference estimator 780 (in particular, the EKF estimator 782) may update C(t) in step 840. Otherwise, in step 850, the interference estimator 780 may set C(t) to a predetermined value (e.g., to zero). Then in step 860, the EKF estimator 782 may perform operations to update the states and the covariance matrix of the updated states (e.g., determine $\hat{x}(t|t)$ and $P(t|t)$) based on the outputs of the wideband meter 740 and the load utilization meter 764 (see discussion on equations (18)-(20) and discussion on equations (21)-(23)).

A look at (28) shows that (29) is equivalent to only running the two last equations of (28). In other words, the filter iterations of (28) may be revised as:

$$
\begin{aligned}
&\text{Initialization:} \\
&\quad t = t_0 \\
&\quad \hat{x}(0 \mid -1) = x_0 \\
&\quad P(0 \mid -1) = P_0 \\
&\text{Iteration over } t \\
&\quad t = t + T \\
&\text{If mod } (t, t_{HARQ,k}) = 0 \\
&\quad C(t) = \left. \frac{\partial c(x)}{\partial x} \right|_{x = \hat{x}(t \mid t - T)} \\
&\quad K_f(t) = P(t \mid t - T) C^T(t) (C(t) P(t \mid t - T) C^T(t) + R_2(t))^{-1} \\
&\quad \hat{x}(t \mid t) = \hat{x}(t \mid t - T) + K_f(t)(y(t) - c(\hat{x}(t \mid t - T))) \\
&\quad P(t \mid t) = P(t \mid t - T) - K_f(t) C(t) P(t \mid t - T) \\
&\text{Else} \\
&\quad \hat{x}(t \mid t) = \hat{x}(t \mid t - T) \\
&\quad P(t \mid t) = (t \mid t - T) \\
&\text{Endif} \\
&\quad \hat{x}(t + T \mid t) = A \hat{x}(t \mid t) + B u(t) \\
&\quad P(t + T) \mid t) = A P(t \mid t) A^T + R_1(t). \\
&\text{End}
\end{aligned}
\tag{30}
$$

The algorithm (30) avoids many computations as compared to (28) and (29). It is also possible to directly predict ahead to the next TTI where the specific HARQ process becomes active. A flow diagram of the second alternative is illustrated in FIG. 9. The apparatuses illustrated in FIGS. 5 and 7 may also perform the second alternative. For example, if HARQ process is active (when mod(t,$t_{HARQ,k}$)=0 in step 930), then in step 965, the EKF estimator 782 may update the states and the covariance matrix of the updated states based on the outputs of the wideband meter 740, the scheduler 770, and the load utilization meter 764. On the other hand, if HARQ process is not active (when mod(t,$t_{HARQ,k}$)≠0), then in step 955, the EKF estimator 782 may simply output previous state and covariance matrix without any updates.

One effect of the above handling can be that the uncertainty will grow between updates in a way consistent with the underlying statistical assumptions on the systems noise. This implies that a larger gain may be applied at the next update, to cover up for the accumulated uncertainty. The gain can be selected to optimally account for the measurement accuracy and for the underlying statistical assumptions of the state model.

The quantities of the EKF for estimation of the other cell interference and the load utilization load factor bias can now be defined in further detail. The description below may be applicable to both alternatives mentioned above. Using (19)-(20) and (22)-(25) and (28) it follows that:

$$C(t) = \begin{pmatrix} C_{11}(t) & C_{12}(t) & C_{13}(t) & 0 \\ 0 & 0 & 0 & C_{24}(t) \end{pmatrix} \quad (31)$$

$$C_{11}(t) = \frac{L_{own}(t-T_D)\hat{x}_2(t\mid t-T)}{(1-L_{own}(t-T_D)\hat{x}_1(t\mid t-T)+\hat{x}_3(t\mid t-T))^2} \quad (32)$$

$$C_{12}(t) = \frac{1}{1-L_{own}(t-T_D)\hat{x}_1(t\mid t-T)+\hat{x}_3(t\mid t-T)} \quad (33)$$

$$C_{13}(t) = -\frac{\hat{x}_2(t\mid t-T)}{(1-L_{own}(t-T_D)\hat{x}_1(t\mid t-T)+\hat{x}_3(t\mid t-T))^2} \quad (34)$$

$$C_{24}(t) = 1 \quad (35)$$

$$R_2(t) = E\left[\begin{pmatrix} e_{RTWP}(t) \\ e_{loadUtilization}(t) \end{pmatrix} (e_{RTWP}(t) \quad e_{loadUtilization}(t))\right] \quad (36)$$

$$= \begin{pmatrix} R_{2,11}(t) & R_{2,12}(t) \\ R_{2,12}(t) & R_{2,22}(t) \end{pmatrix}$$

$$c(\hat{x}(t\mid t-T)) = \begin{pmatrix} \frac{\hat{x}_2(t\mid t-T)}{(1-L_{own}(t-T_D)\hat{x}_1(t\mid t-T)+\hat{x}_3(t\mid t-T))} \\ \hat{x}_4(t\mid t-T) \end{pmatrix} \quad (37)$$

$$A = \begin{pmatrix} 1 & 0 & 0 & 0 \\ 0 & 1 & 0 & 0 \\ 0 & 0 & a & 0 \\ 1 & 0 & 0 & 0 \end{pmatrix} \quad (38)$$

$$B = 0 \quad (39)$$

$$R_1(t) = E\left[\begin{pmatrix} w_1(t) \\ w_2(t) \\ w_3(t) \\ w_4(t) \end{pmatrix} (w_1(t) \quad w_2(t) \quad w_3(t) \quad w_4(t))\right] \quad (40)$$

$$= \begin{bmatrix} R_{1,11}(t) & R_{1,12}(t) & R_{1,13}(t) & R_{1,14}(t) \\ R_{1,12}(t) & R_{1,22}(t) & R_{1,23}(t) & R_{1,24}(t) \\ R_{1,13}(t) & R_{1,23}(t) & R_{1,33}(t) & R_{1,34}(t) \\ R_{1,14}(t) & R_{1,24}(t) & R_{1,34}(t) & R_{1,44}(t) \end{bmatrix}.$$

In order to execute the EKF, the state prediction and the state covariance prediction at time t are needed, they are given by the following equations:

$$\hat{x}(t\mid t-T) = \begin{pmatrix} \hat{x}_1(t\mid t-T) \\ \hat{x}_2(t\mid t-T) \\ \hat{x}_3(t\mid t-T) \\ \hat{x}_4(t\mid t-T) \end{pmatrix} \quad (41)$$

$$P(t\mid t-T) = \begin{pmatrix} P_{11}(t\mid t-T) & P_{12}(t\mid t-T) & P_{13}(t\mid t-T) & P_{14}(t\mid t-T) \\ P_{12}(t\mid t-T) & P_{22}(t\mid t-T) & P_{23}(t\mid t-T) & P_{24}(t\mid t-T) \\ P_{13}(t\mid t-T) & P_{23}(t\mid t-T) & P_{33}(t\mid t-T) & P_{34}(t\mid t-T) \\ P_{14}(t\mid t-T) & P_{24}(t\mid t-T) & P_{34}(t\mid t-T) & P_{44}(t\mid t-T) \end{pmatrix}. \quad (42)$$

The equations (31)-(42) can define the EKF completely, when inserted in (28) and (29) for the first alternative and in (30) for the second alternative. The final step to compute the other cell interference estimate can be:

$$\hat{P}_{other}(t\mid t) = \hat{x}_2(t\mid t) - \hat{P}_N(t\mid t). \quad (43)$$

Figure 10:
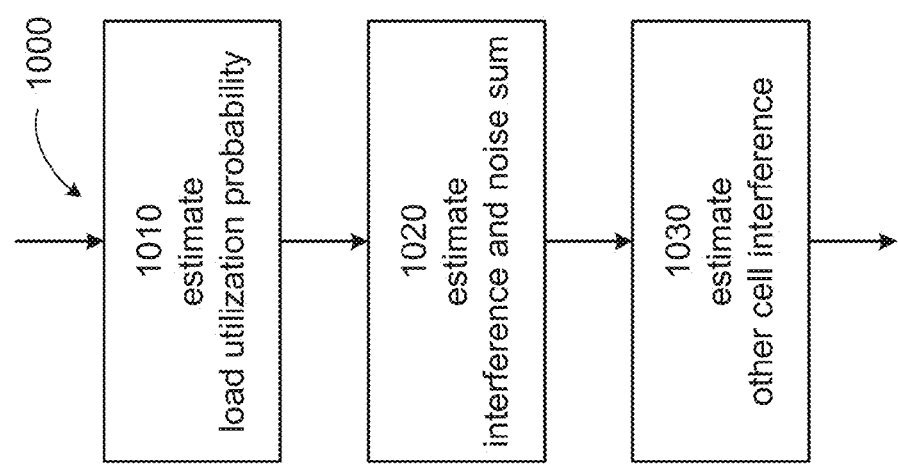
FIG. 10 illustrates a flow chart of example method performed by a radio network node to determine an other cell interference.

FIG. 10 illustrates a flow chart of example method 1000 performed by a radio network node 410 to implement a high performing estimator. The method 1000 may be performed by the scheduler 540, e.g., as load estimation functionality associated with the scheduler, to determine the other cell interference $P_{other}(t)$. In particular, the other cell interference estimate $\hat{P}_{other}(t)$ can be determined in the context of TD-scheduling environment. For example, the other cell interference $P_{other}(t)$ can be estimated only for each TD slot in a subset of TD slots. The subset may be determined as a union of TD slots in which a same set of wireless terminals are scheduled. The other cell interference $P_{other}(t)$ can express a sum of interferences present in the cell of interest 420 due to wireless activities applicable at the time t in one or more cells other than in the cell of interest.

As illustrated, in step 1010, the interference estimator 580, 780 of the radio network node 410, and in particular the interference and noise estimator 782, can estimate the load utilization probability $p_{load}(t_1)$ to obtain a load utilization probability estimate $\hat{p}_{load}(t_1)$ applicable at a time $t=t_1$. The estimation can be made based on at least on a load utilization probability estimate $\hat{p}_{load}(t_0)$ and an interference-and-noise sum estimate $\hat{P}_{other}(t_0)+\hat{P}_N(t_0)$ applicable at time $t=t_0$. It should be noted that the term "t" enclosed in parentheses in the expressions without subscripts (e.g., $P_{other}(t)$, $p_{load}(t)$, etc.) is intended to indicate time variable in general, and the same term "t" enclosed in parentheses with subscripts (e.g., $P_{other}(t_0)$, $p_{load}(t_1)$, etc.) is intended to indicate a particular time. Thus, time $t_1$ may also be viewed as $t=t_1$ for example.

The particular times $t_0$ and $t_1$ are assumed such that $t_1-t_0=T>0$. T can represent a duration between estimation times. In an embodiment, T is a positive integer multiple of a transmission time interval, preferably one (e.g., for 10 ms TTI) but can be larger (e.g., 5 for 2 ms TTI). In the method 1000, it can be assumed the values of the quantities at time $t=t_0$ (or simply at time $t_0$) are known (have been measured, computed, received, or otherwise have been determined), and the values of one or more quantities at time $t=t_1$ are estimated or otherwise predicted.

In step 1020, the interference estimator 580, 780 can estimate the interference-and-noise sum $P_{other}(t_1)+P_N(t_1)$ to obtain the interference-and-noise sum estimate $\hat{P}_{other}(t_1)+\hat{P}_N(t_1)$ applicable at the time $t=t_1$. This estimation can be made based at least on the load utilization probability estimate $\hat{p}_{load}(t_0)$ and the interference-and-noise sum estimate $\hat{P}_{other}(t_0)+\hat{P}_N(t_0)$.

Figure 11:
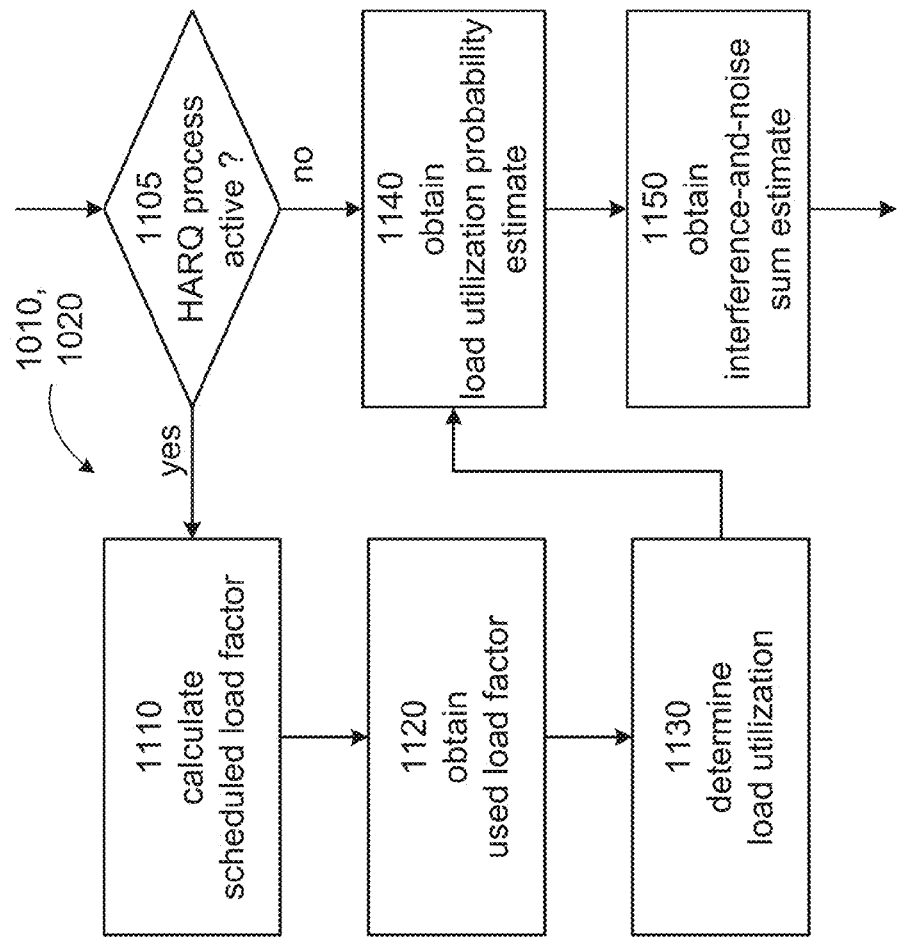
FIG. 11 illustrates a flow chart of an example process performed by a radio network node to estimate a load utilization probability and an interference-and-noise sum.

FIG. 11 illustrates a flow chart of an example process performed by the radio network node 410 to implement the steps 1010 and 1020 to obtain the load utilization probability estimate $\hat{p}_{load}(t_1)$ and to obtain the interference-and-noise sum estimate $\hat{P}_{other}(t_1)+\hat{P}_N(t_1)$. In step 1110, a scheduled load factor $L_{own}(t_1-T_D)$ can be calculated by the load meter 560, 760. Here, $T_D$ can represent a delay between the calculation of the scheduled load factor and a time the schedule takes effect on an air interface. The scheduled load factor $L_{own}(t-T_D)$ can express an amount of the radio resource grants scheduled to be used by the cell terminals 430 for uplink transmissions at the time t.

In step 1120, a used load factor $\overline{L}_{own}(t_1-T_D)$ can be obtained by the load meter 560, 760. Note that the used load factor $\overline{L}_{own}(t-T_D)$ can express an amount of the scheduled radio resource grants used by the cell terminals 430 for the uplink transmissions at the time t.

In step 1130, a load utilization $$\frac{\overline{L}_{own}(t_1 - T_D)}{L_{own}(t_1 - T_D)}$$

can be measured or otherwise determined also by the load meter 560, 760. Based on the measured load utilization $$\frac{\overline{L}_{own}(t_1 - T_D)}{L_{own}(t_1 - T_D)},$$

the interference estimator 580, 780 may obtain the load utilization probability estimate $\hat{p}_{load}(t_1)$ in step 1140 and obtain the interference-and-noise sum estimate $\hat{P}_{other}(t_1)+\hat{P}_N(t_1)$ in step 1150.

In one embodiment, the radio network node 410 may simply perform all of the steps 1110 to 1150. But recall from above that in TDM setting, it is possible to allocate grants to a user that is only valid for specified HARQ processes. Thus, in an alternative, the radio network node 410 may determine whether a HARQ process is active at the time $t_1$ in step 1105. The steps 1110, 1120 and 1130 may be performed only when it is determined that the HARQ process is active and the steps 1140 and 1150 may performed may be as described above. On the other hand, if it is determined that the HARQ process is not active in step 1105, then the process may proceed to steps 1140 and 1150 in which the load utilization probability estimate $\hat{p}_{load}(t_1)$ is obtained from the previous load utilization probability estimate $\hat{p}_{load}(t_0)$ and the interference-and-noise sum estimate $\hat{P}_{other}(t_1)+\hat{P}_N(t_1)$ is obtained from the previous interference-and-noise sum estimate $\hat{P}_{other}(t_0)+\hat{P}_N(t_0)$.

The following should be kept in mind. In actuality, the load meter 560, 760 may continue to calculate the scheduled load factor, obtain the used load factor, and determine the load utilization continuously. However, at a given time, the associated HARQ process may not be active. In this scenario, the corresponding interference estimator 570, 580 need not consider information from the load meter 560, 760.

Figure 12:
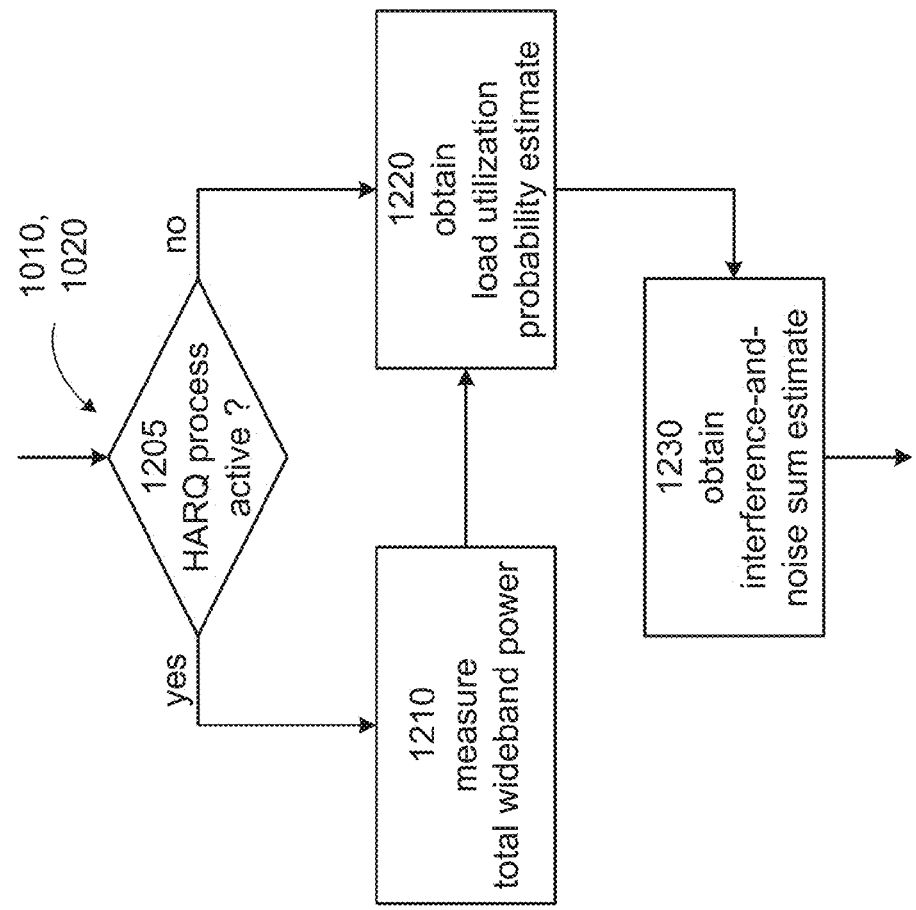
FIG. 12 illustrates a flow chart of another example process performed by a radio network node to estimate a load utilization probability and an interference-and-noise sum.

FIG. 12 illustrates a flow chart of another example process performed by the radio network node 410 to implement the steps 1010 and 1020 to obtain the load utilization probability estimate $\hat{p}_{load}(t_1)$ and to obtain the interference-and-noise sum estimate $\hat{P}_{other}(t_1)+\hat{P}_N(t_1)$. In step 1210, a total wideband power $y_{RTWP}(t_1)$ can be measured by the wideband meter 540, 740. Based on the measured total wideband power $y_{RTWP}(t_1)$, the interference estimator 580, 780 may obtain the load utilization probability estimate $\hat{p}_{load}(t_1)$ in step 1220, and obtain the interference-and-noise sum estimate $\hat{P}_{other}(t_1)+\hat{P}_N(t_1)$ in step 1230.

The radio network node 410 may simply perform all of the steps 1210 to 1230. But in an alternative, the radio network node 410 may determine whether a HARQ process is active at the time $t_1$ in step 1205. The step 1210 may be performed only when it is determined that the HARQ process is active and steps 1220 and 1230 may be as described above. On the other hand, if it is determined that the HARQ process is not active in step 1205, then the process may proceed to steps 1220 and 1230 in which the load utilization probability estimate $\hat{p}_{load}(t_1)$ is obtained from the previous load utilization probability estimate $\hat{p}_{load}(t_0)$ and the interference-and-noise sum estimate $\hat{P}_{other}(t_1)+\hat{P}_N(t_1)$ is obtained from the previous interference-and-noise sum estimate $\hat{P}_{other}(t_0)+\hat{P}_N(t_0)$.

Figure 13:
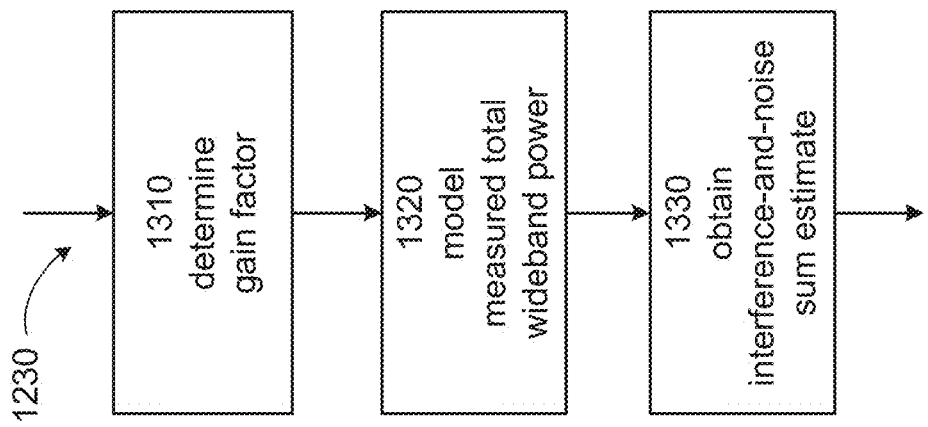
FIG. 13 illustrates a flow chart of an example process performed by a radio network node to obtain an interference-and-noise sum estimate.

FIG. 13 illustrates a flow chart of an example process performed by the radio network node 410, e.g., by the interference estimator 580, 780, to implement the step 1230 to obtain the interference-and-noise sum estimate $\hat{P}_{other}(t_1)+\hat{P}_N(t_1)$. In step 1310, a gain factor $g(t_1)$ can be determined based on the load utilization probability estimate $\hat{p}_{load}(t_1)$ and the scheduled load factor $L_{own}(t_0)$. In step 1320, the measured total wideband power $y_{RTWP}(t_1)$ can be modeled as a combination of the interference-and-noise sum estimate $\hat{P}_{other}(t_1)+\hat{P}_N(t_1)$ weighted by the gain factor $g(t_1)$ and a measurement uncertainty $e_{RTWP}(t_1)$. Based on the measured total wideband power $y_{RTWP}(t_1)$ and the modeling thereof, the interference-and-noise sum estimate $\hat{P}_{other}(t_1)+\hat{P}_N(t_1)$ can be obtained.

Figure 14:
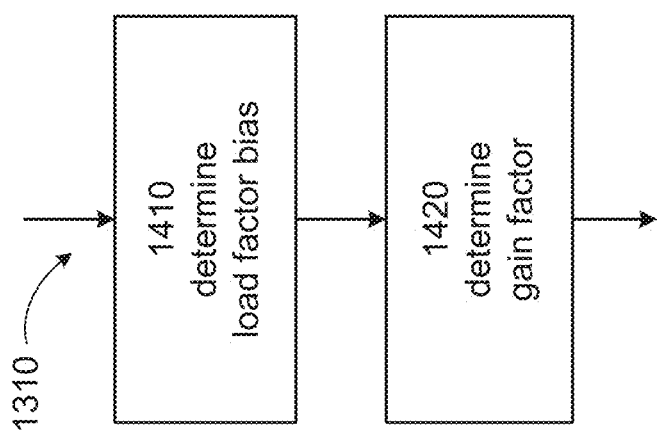
FIG. 14 illustrates a flow chart of an example process performed by a radio network node to determine a gain factor.

FIG. 14 illustrates a flow chart of an example process performed by the radio network node 410 to implement the step 1310 to determine the gain factor $g(t_1)$. In step 1410, a load factor bias $\Delta L_{own}(t_1)$ can be determined. The load factor bias $\Delta L_{own}(t)$ can express an error of the scheduled load factor $L_{own}(t)$. In step 1420, the gain factor $g(t_1)$ can be determined based on the based at least on the load utilization probability estimate $\hat{p}_{load}(t_1)$, the scheduled load factor $L_{own}(t_0)$, and the load factor bias $\Delta L_{own}(t_1)$.

Referring back to FIG. 10, once the interference-and-noise sum estimate $\hat{P}_{other}(t_1)+\hat{P}_N(t_1)$ is determined in step 1020, the interference estimator 580, 780 of the radio network node 410 can estimate the other cell interference $P_{other}(t_1)$ to obtain the other cell interference estimate $\hat{P}_{other}(t_1)$. The estimation can be based at least on the interference-and-noise sum estimate $\hat{P}_{other}(t_1)+\hat{P}_N(t_1)$ and a thermal noise estimate $\hat{P}_N(t_1)$. Note that the interference-and-noise sum $P_{other}(t)+P_N(t)$ can express a sum of undesired signals, other than an own cell load $P_{own}(t)$. In FIG. 4, the interference-and-noise sum $P_{other}(t)+P_N(t)$ are visually illustrated with shaded arrows (from the other terminals 435) and the large white arrow.

Figure 15:
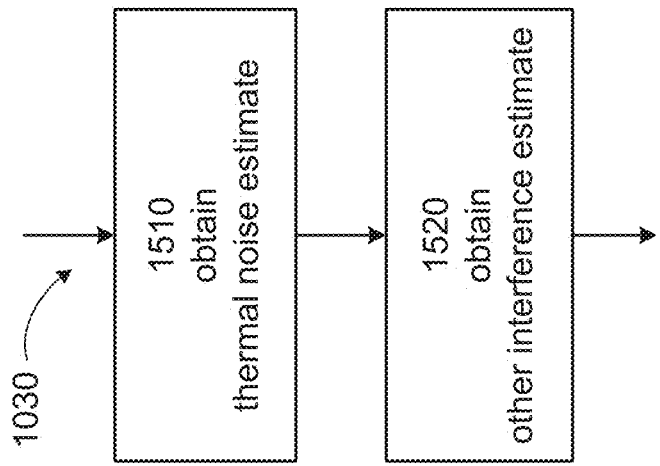
FIG. 15 illustrates a flow chart of an example process performed by a radio network node to determine an other cell interference estimate.

It can then be seen that once the once the interference-and-noise sum estimate $\hat{P}_{other}(t_1)+\hat{P}_N(t_1)$ is determined, the other cell interference estimate $\hat{P}_{other}(t)$ can be arrived at if the thermal noise $\hat{P}_N(t)$ can be determined. FIG. 15 illustrates a flow chart of an example process performed by the radio network node 410 to implement the step 1030 of estimating the other cell interference $P_{other}(t_1)$. In step 1510, the thermal noise estimate $\hat{P}_N(t_1)$ can be obtained by the noise estimator 550, 750. In one embodiment, a thermal noise floor estimate $\hat{N}(t_1)$ corresponding to the cell of interest 420 can be obtained as the thermal noise estimate $\hat{P}_N(t_1)$. In step 1520, thermal noise estimate $\hat{P}_N(t_1)$ can be subtracted from the interference-and-noise sum estimate $\hat{P}_{other}(t_1)+\hat{P}_N(t_1)$ to obtain the other cell interference estimate $\hat{P}_{other}(t_1)$.

Figure 16:
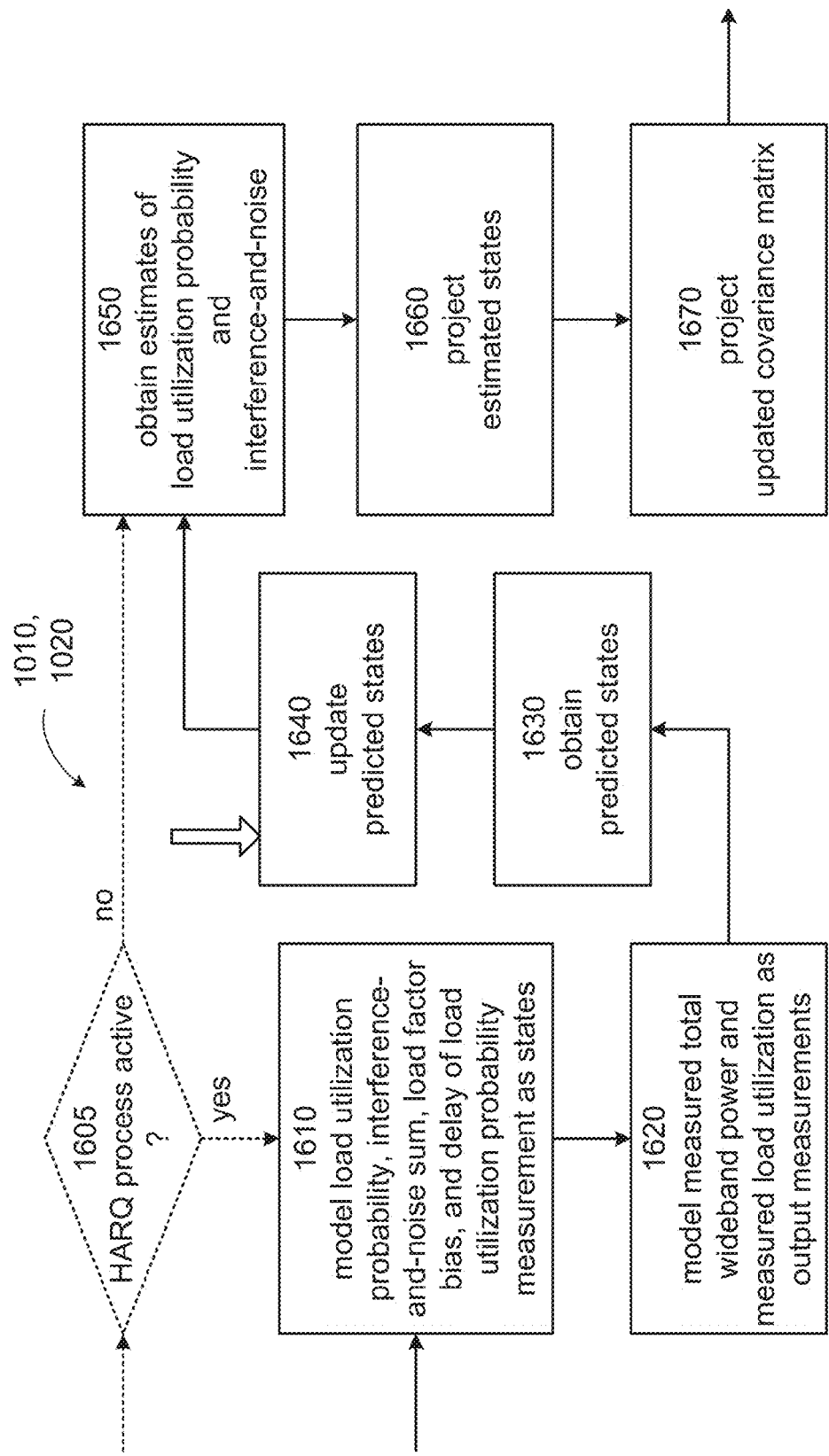
FIG. 16 illustrates a flow chart of yet another example process performed by a radio network node to estimate the load utilization probability and to estimate the interference-and-noise sum.

FIG. 16 illustrates another flow chart of an example process performed by the radio network node 410 to implement the steps 1010 and 1020 to obtain the load utilization probability estimate $\hat{p}_{load}(t_1)$ and to obtain the interference-and-noise sum estimate $\hat{P}_{other}(t_1)+\hat{P}_N(t_1)$. FIG. 16 may be viewed as a specific instance of the flow chart illustrated in FIG. 11. In FIG. 16, the extended Kalman filtering adapted for estimation is used. In one embodiment, the interference estimator 580, 780 may perform the illustrated steps.

In step 1605, whether a HARQ process is active may be determined. If so, the process may proceed to step 1610. Otherwise, the process may proceed to step 1650. Note that step 1605 is not strictly required, but it is preferred. Recall that in an aspect, there may be multiple instances of other cell interference estimation processes, where each instance is for a particular TD slot. This can allow a slower varying own cell load factor, which can enhance estimation accuracy.

In step 1610, the load utilization probability $p_{load}(t)$ and the interference-and-noise sum $P_{other}(t)+P_N(t)$ can be modeled as first and second states $x_1(t)=p_{load}(t)$, $x_2(t)=P_{other}(t)+P_N(t)$ in a state vector $x(t)$ of a state space model.

In this context, the state space model can be characterized through equations $x(t+T)=A(t)x(t)+B(t)u(t)+w(t)$ and $y(t)=c(x(t))+e(t)$. In these equations, $x(t)$ represents the state vector, $u(t)$ represents an input vector, $y(t)$ represents the output measurement vector, $w(t)$ represents a model error vector, $e(t)$ represents a measurement error vector, $A(t)$ represents a system matrix describing dynamic modes of the system, $B(t)$ represents an input gain matrix, $c(x(t))$ represents a measurement vector which is a function of the states of the system, t represents the time and T represents a sampling period. Thus, it is seen that modeling errors and measurement errors are incorporated in the state space model.

In step 1620, the measured total wideband power $y_{RTWP}(t)$ (from the wideband meter 540, 740) and the measured load utilization $y_{loadUtilization}(t)$ (from the load meter 560, 760) can be modeled in the output measurement vector $y(t)$ of the state space model.

In step 1630, a predicted state vector $\hat{x}(t_1|t_0)$ can be obtained. The predicted state vector $\hat{x}(t_1|t_0)$ includes first and second predicted states $\hat{x}_1(t_1|t_0)$, $\hat{x}_2(t_1|t_0)$ whose values are based on the load utilization probability estimate $\hat{p}_{load}(t_0)$ and the interference-and-noise sum estimate $\hat{P}_{other}(t_0)+\hat{P}_N(t_0)$. In this context, the predicted state vector $\hat{x}(t|t-T)$ denotes a prediction of the state vector $x(t)$ based on information available up to time $t-T$. Recall from above that $t_1-t_0=T>0$. Thus, the predicted state vector $\hat{x}(t_1|t_0)$ denotes a prediction the state vector $x(t)$ at time $t=t_1$ based on information available up to time $t=t_0$. The time $t=t_0$ can be a time of initialization or a time of a previous iteration.

In step 1640, the predicted state vector $\hat{x}(t_1|t_0)$ can be updated based on one or more measurements included in an output measurement vector $y(t_1)$ applicable at the time $t=t_1$ to obtain an estimated state vector $\hat{x}(t_1|t_1)=\hat{x}(t_1)$. The measurements can include the measured received total wideband power $y_{RTWP}(t_1)$ and the load utilization $y_{load}(t_1)$. The solid white arrow entering the step 1640 in FIG. 16 is to indicate that measurements may come into the step. Generally, the estimated state vector $\hat{x}(t|t)=\hat{x}(t)$ denotes an estimate of the state vector $x(t)$ based on information available up to time t. This step corresponds to an adjusting step of the Kalman filter algorithm in which the prediction made in the previous time (e.g., at time $t=t_0$) is adjusted according to measurements made in the current time (e.g., at time $t=t_1$).

In step 1650, first and second estimated states $\hat{x}_1(t_1)$, $\hat{x}_2(t_1)$ can be obtained from the estimated state vector $\hat{x}(t_1)$ respectively as the load utilization probability estimate $\hat{x}_1(t_1)=\hat{p}_{load}(t_1)$ and the interference-and-noise sum estimate $\hat{x}_2(t_1)=\hat{P}_{other}(t_1)+\hat{P}_N(t_1)$. Note that if step 1650 is entered from step 1640 (e.g., when step 1605 is not performed or when the HARQ process is active), the states would have been updated in step 1640. If the HARQ process is not active, then the previous estimated states may be utilized.

In step 1660, the estimated state vector $\hat{x}(t_1)$ is projected based at least on dynamic modes corresponding to the cell of interest to obtain a predicted state vector $\hat{x}(t_2|t_1)$, $t_2-t_1=T$. Here, the predicted state vector $\hat{x}(t_2|t_1)$ includes first and second predicted states $\hat{x}_1(t_2|t_1)$ and $\hat{x}_2(t_2|t_1)$ whose values are based on the load utilization probability estimate $\hat{p}_{load}(t_1)$ and the interference-and-noise sum estimate $\hat{x}_2(t_1)=\hat{P}_{other}(t_1)+\hat{P}_N(t_1)$. This step corresponds to a predicting step of the Kalman filter algorithm in which future states are predicted based on current information. As seen, the steps in FIG. 16 can be iteratively performed.

In one embodiment, the steps 1640 and 1660 of updating the predicted state vector $\hat{x}(t_1|t_0)$ and of projecting the estimated state vector $\hat{x}(t_1|t_1)$ comprise performing a Kalman filter process to iteratively predict and update the state vector $x(t)$ to obtain the estimated state vector $\hat{x}(t)$. Here, the estimated state vector $\hat{x}(t)$ includes the first and second estimated states $\hat{x}_1(t)$ and $\hat{x}_2(t)$ corresponding to the load utilization probability estimate $\hat{p}_{load}(t)$ and the interference-and-noise sum estimate $\hat{P}_{other}(t)+\hat{P}_N(t)$.

In addition to the load utilization probability $p_{load}(t)$ and the interference-and-noise sum $P_{other}(t)+P_N(t)$ modeled as first and second states $x_1(t)=p_{load}(t)$, $x_2(t)=P_{other}(t)+P_N(t)$ in step 1610, third and fourth states $x_3(t)=\Delta L_{own}(t)$, $x_4(t)=x_1(t-T)$ may also be modeled in the state vector $x(t)$ of the state space model in step 1615. The third state $x_3(t)=\Delta L_{own}(t)$ can represent a load factor bias expressing an error of a scheduled load factor $L_{own}(t)$, and the fourth state $x_4(t)=x_1(t-T)$ can reflect that the load utilization probability measurement is subject to a delay corresponding to the sampling period T. The step 1615 need not be performed if the third and fourth states are not used, and therefore, can be considered as optional. However, the third and fourth states are preferred to be used.

Figure 17:
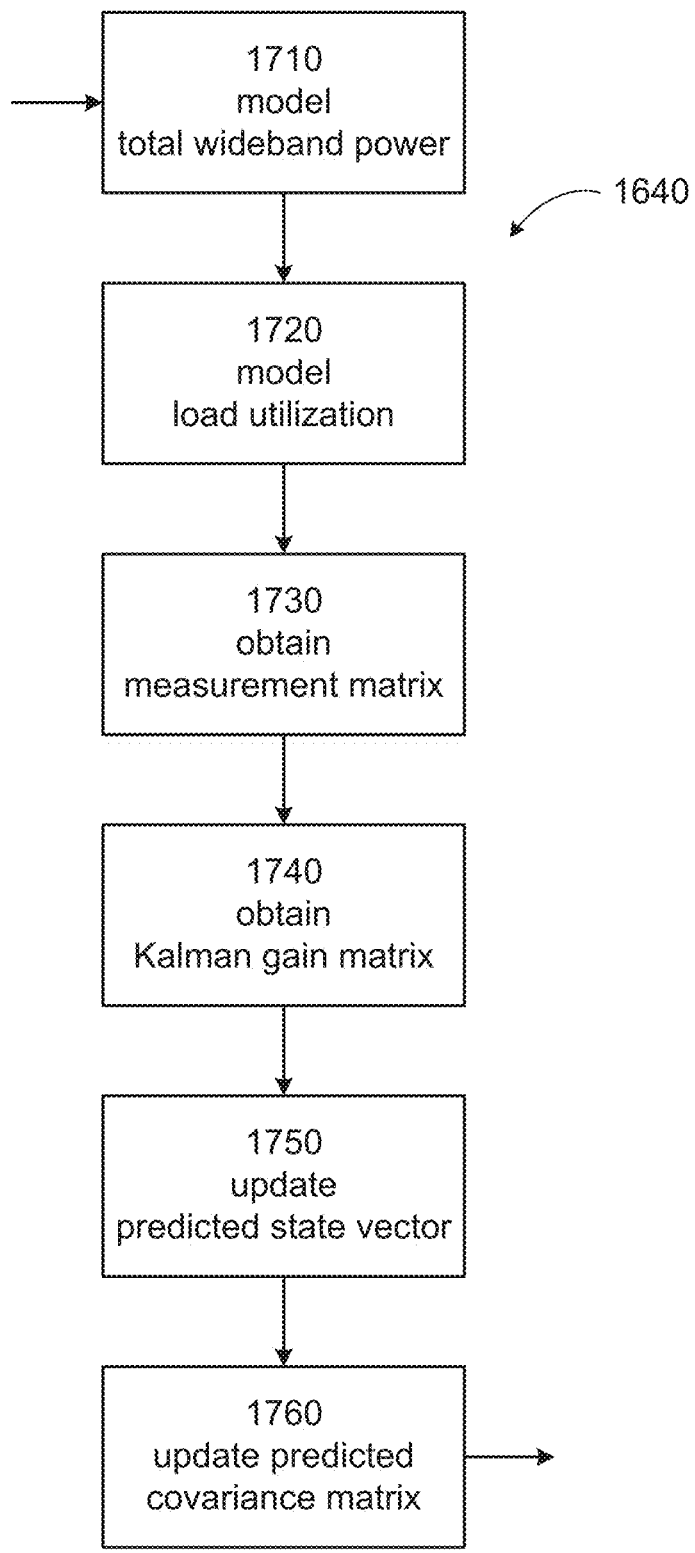
FIG. 17 illustrates a flow chart of an example process performed by a radio network node to perform a Kalman filter update of a predicted state vector.

FIG. 17 illustrates a flow chart of an example process performed by the radio network node 410 to implement the step 1640 to update predicted state vector $\hat{x}(t_1|t_0)$ when the third and fourth states are also modeled. The interference estimator 580, 780 may perform the illustrated steps. In step 1710, the measured total wideband power $y_{RTWP}(t_1)$ applicable at the time $t=t_1$ can be modeled as:

$$y_{RTWP}(t_1) = \frac{x_2(t_1)}{1 - L_{own}(t_1 - T_D)x_1(t_1) + x_3(t_1)} + e_{RTWP}(t_1). \quad (42)$$

Here, $T_D$ can represent a delay between calculation of the schedule and a time the schedule takes effect on an air interface. Also, $e_{RTWP}(t)$ can represent a measurement error.

In step 1720, the load utilization $y_{loadUtilization}(t_1)$ applicable at the time $t=t_1$ as can be modeled as:

$$y_{loadUtilization}(t_1) = x_4(t_1) + e_{loadUtilization}(t_1). \quad (43)$$

Again, $e_{loadUtilization}(t)$ can represent a measurement error.

In step 1730, the measurement matrix $C(t_1)$ around the predicted state vector $\hat{x}(t_1|t_0)$ can be obtained. Here, the predicted state vector $\hat{x}(t_1|t_0)$ can include the first, second, third, and fourth predicted states $\hat{x}_1(t_1|t_0)$, $\hat{x}_2(t_1|t_0)$, $\hat{x}_3(t_1|t_0)$, $\hat{x}_4(t_1|t_0)$ which are predicted based on data up to the time $t=t_0$. In an embodiment, the measurement matrix $C(t_1)$ can be obtained by determining the measurement matrix $C(t_1)$ linearized around the predicted state vector $\hat{x}(t_1|t_0)$ such that $$C(t) = \frac{\partial c(x)}{\partial x}\bigg|_{x=\hat{x}(t1|t0)}.$$

Figure 18:
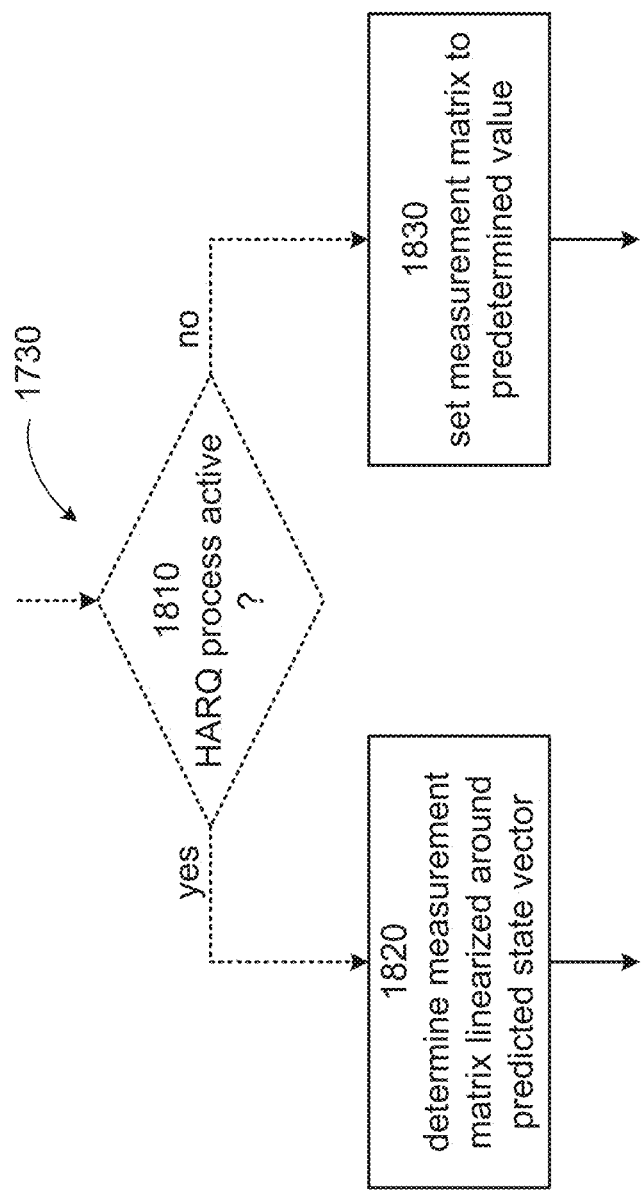
FIG. 18 illustrates a flow chart of an example process performed by a radio network node to determine a measurement matrix.

But in another embodiment, the measurement matrix $C(t_1)$ may be determined differently based on different circumstances. For example, as illustrated in FIG. 18. the interference estimator 580, 780 may determine whether or not a HARQ process is active. If so, the measurement matrix $C(t_1)$ may be determined as described immediately in step 1830. If not, the measurement matrix $C(t_1)$ may be set to a predetermined value such as zero.

In step 1740, a Kalman gain matrix $K_f(t_1)$ can be obtained based on at least the measurement matrix $C(t_1)$, the measurement error vector $e(t_1)$, and a predicted covariance matrix $P(t_1|t_0)$ corresponding to the predicted state vector $\hat{x}(t_1|t_0)$. In an embodiment, the Kalman gain matrix $K_f(t_1)$ can be obtained by determining:

$$K_f(t_1)=P(t_1|t_0)C^T(t_1)(C(t_1)P(t_1|t_0)C^T(t_1)+R_2(t_1))^{-1} \quad (44)$$

in which $C^T(t)$ is a transpose of the measurement matrix $C(t)$ and $(R_2(t))$ is a measurement covariance matrix corresponding to the measurement error vector $e(t)$.

In step 1750, the predicted state vector $\hat{x}(t_1|t_0)$ can be updated based on at least the Kalman gain matrix $K_f(t_1)$, the output measurement vector $y(t_1)$, and the measurement vector $c(x(t_1))$ to obtain the estimated state vector $\hat{x}(t_1|t_1)=\hat{x}(t_1)$. The estimated state vector $\hat{x}(t_1)$ can include the first, second, third, and fourth estimated states $\hat{x}_1(t_1), \hat{x}_2(t_1), \hat{x}_3(t_1), \hat{x}_4(t_1)$. In an embodiment, the estimated state vector $\hat{x}(t_1|t_1)=\hat{x}(t_1)$ can be obtained through determining:

$$\hat{x}(t_1|t_1)=\hat{x}(t_1|t_0)+K_f(t_1)(y(t_1)-c(\hat{x}(t_1|t_0))). \quad (45)$$

Here $y(t_1)$ is the measurement vector, with components being the received total wideband power measurement and the load utilization measurement.

In step 1760, the predicted covariance matrix $P(t_1|t_0)$ can be updated based on at least the Kalman gain matrix $K_f(t_1)$ and the measurement matrix $C(t_1)$ to obtain an updated covariance matrix $P(t_1|t_1)$ corresponding to the estimated state vector $\hat{x}(t_1)$. In an embodiment, the updated covariance matrix $P(t_1|t_1)$ can be obtained through determining:

$$P(t_1|t_1)=P(t_1|t_0)-K_f(t_1)C(t_1)P(t_1|t_0). \quad (46)$$

Referring back to FIG. 16, when there are first through fourth states, the step 1660 of projecting the estimated state vector $\hat{x}(t_1)$ can comprise projecting the estimated state vector $\hat{x}(t_1)$ based on at least the system matrix $A(t_1)$ to obtain the predicted state vector $\hat{x}(t_2|t_1)$. Here, the predicted state vector $\hat{x}(t_2|t_1)$ includes the first, second, third, and fourth predicted states $\hat{x}_1(t_2|t_1), \hat{x}_2(t_2|t_1), \hat{x}_3(t_2|t_1), \hat{x}_4(t_2|t_1)$. Then in step 1670, the updated covariance matrix $P(t_1|t_1)$ can be projected to obtain a predicted covariance matrix $P(t_2|t_1)$ based on at least the system matrix $A(t_1)$ and a system noise covariance matrix $R_1(t_1)$. Back in step 1660, the predicted state vector $\hat{x}(t_2|t_1)$ can be obtained by determining $\hat{x}(t_2|t_1)=A\hat{x}(t_1|t_1)+Bu(t_1)$, and in step 1670, the predicted covariance matrix $P(t_2|t_1)$ can be obtained through determining $P(t_2|t_1)=AP(t_1|t_1)A^T+R_1(t_1)$ in which $A^T$ is a transpose of the system matrix $A(t)$. Note that the input gain matrix $B(t)$ can be set to zero.

A non-exhaustive list of advantages of the subject matter of the disclosed subject matter includes:

Enhanced feature compatibility in RBS estimation—neighbor cell interference power estimation becomes available together with TD-scheduling.

Much improved interference management and reduced interference impairments in association with TD-scheduling and with in HetNets, by enhanced possibilities for fine control of the interference situation.

Enhanced capacity of cellular network, e.g., WCDMA network, and in particular for TD-scheduling.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed at a radio network node corresponding to a cell of interest in a wireless network, the method comprising:

estimating an interference-and-noise sum $P_{other}(t_1)+P_N(t_1)$ based at least on a load utilization probability estimate $\hat{p}_{load}(t_0)$ and an interference-and-noise sum estimate $\hat{P}_{other}(t_0)+\hat{P}_N(t_0)$ applicable at a time $t_0$ to obtain an interference-and-noise sum estimate $\hat{P}_{other}(t_1)+\hat{P}_N(t_1)$ applicable at a time $t_1$, wherein $t_1-t_0=T>0$; and estimating an other cell interference $P_{other}(t_1)$ based at least on the interference-and-noise sum estimate $\hat{P}_{other}(t_1)+\hat{P}_N(t_1)$ and a thermal noise estimate $\hat{P}_N(t_1)$ to obtain an other cell interference estimate $\hat{P}_{other}(t_1)$ applicable at the time $t_1$, wherein the interference-and-noise sum $P_{other}(t)+P_N(t)$ expresses a sum of undesired signals, other than an own cell load $P_{own}(t)$, applicable at the time t, and the interference-and-noise sum estimate $\hat{P}_{other}(t)+\hat{P}_N(t)$ being an estimate thereof, the own cell load $P_{own}(t)$ expressing a sum of signals due to wireless activities in the cell of interest applicable at the time t, wherein the other cell interference $P_{other}(t)$ expresses a sum of interferences present in the cell of interest due to wireless activities applicable at the time t in one or more cells other than in the cell of interest, and the other cell interference estimate $\hat{P}_{other}(t)$ being an estimate thereof, wherein a thermal noise $P_N(t)$ expresses a sum of undesired signals present in the cell of interest at the time t other than the own cell load $P_{own}(t)$ and other than the other cell interference $P_{other}(t)$, and the thermal noise estimate $\hat{P}_N(t)$ being an estimate thereof, and wherein the interference-and-noise sum estimate $\hat{P}_{other}(t)+\hat{P}_N(t)$ and the other cell interference estimate $\hat{P}_{other}(t_1)$ are based on a state space model comprising at least a measurement matrix $C(t_1)$.

2. The method of claim 1, wherein the method is performed in a TD-scheduling environment such that the other cell interference $P_{other}(t_1)$ is estimated only for each TD slot in a subset of TD slots, the subset being determined as a union of TD slots in which a same set of wireless terminals are scheduled.

3. The method of claim 1, further comprising:

estimating a load utilization probability $p_{load}(t_1)$ based at least on the load utilization probability estimate $\hat{p}_{load}(t_0)$ and the interference-and-noise sum estimate $\hat{P}_{other}(t_0))+\hat{P}_N(t_0)$ applicable at the time $t_0$ to obtain a utilization probability estimate $\hat{p}_{load}(t_1)$ applicable at the time $t_1$, wherein the load utilization probability $p_{load}(t)$ expresses a relationships between radio resource grants scheduled to one or more cell terminals and radio resource grants used by the same cell terminals applicable at a time t, each cell terminal being a wireless terminal in the cell of interest, and the load utilization probability estimate $\hat{p}_{load}(t)$ being an estimate thereof, and wherein the load utilization probability estimate $\hat{p}_{load}(t)$ is estimated based on the state space model comprising at least the measurement matrix $C(t_1)$.

4. The method of claim 3, wherein the step of estimating the load utilization probability $p_{load}(t_1)$ and the step of estimating the interference-and-noise sum $P_{other}(t_1)+P_N(t_1)$ comprise:

calculating a scheduled load factor $L_{own}(t_1-T_D)$;
obtaining a used load factor $\overline{L}_{own}(t_1-T_D)$;
measuring a load utilization $$\frac{\overline{L}_{own}(t_1 - T_D)}{L_{own}(t_1 - T_D)}$$

based on the scheduled and measured load factors;
obtaining the utilization probability estimate $\hat{p}_{load}(t_1)$; and
obtaining the interference-and-noise sum estimate $\hat{P}_{other}(t_1)+\hat{P}_N(t_1)$, wherein the scheduled load factor $L_{own}(t-T_D)$ expresses an amount of the radio resource grants scheduled to be used by the cell terminals for uplink transmissions at the time t, and wherein the used load factor $\overline{L}_{own}(t-T_D)$ expresses an amount of the scheduled radio resource grants used by the cell terminals for the uplink transmissions at the time t, and wherein $T_D$ represents a delay between calculation of the scheduled load factor and a time the schedule takes effect on an air interface.

5. The method of claim 4, wherein the step of estimating the load utilization probability $p_{load}(t_1)$ and the step of estimating the interference-and-noise sum $P_{other}(t_1)+P_N(t_1)$ comprise:

determining whether a HARQ process is active at the time $t_1$, wherein the load utilization probability estimate $\hat{p}_{load}(t_1)$ and the interference-and-noise sum estimate $\hat{P}_{other}(t_1)+\hat{P}_N(t_1)$ are obtained based on the measured load utilization $$\frac{\overline{L}_{own}(t_1 - T_D)}{L_{own}(t_1 - T_D)}$$

when it is determined that the HARQ process is active, and wherein the load utilization probability estimate $\hat{p}_{load}(t_1)$ is obtained from the previous load utilization probability estimate $\hat{p}_{load}(t_0)$ and the interference-and-noise sum estimate $\hat{P}_{other}(t_1)+\hat{P}_N(t_1)$ is obtained from the previous interference-and-noise sum estimate $\hat{P}_{other}(t_0))+\hat{P}_N(t_0)$ when it is determined that the HARQ process is not active.

6. The method of claim 3, wherein the step of estimating the load utilization probability $p_{load}(t_1)$ and the step of estimating the interference-and-noise sum $P_{other}(t_1)+P_N(t_1)$ comprise:

measuring a total wideband power $y_{RTWP}(t_1)$;
obtaining the load utilization probability estimate $\hat{p}_{load}(t_1)$; and obtaining the interference-and-noise sum estimate $\hat{P}_{other}(t_1)+\hat{P}_N(t_1)$.

7. The method of claim 6, wherein the step of estimating the load utilization probability $p_{load}(t_1)$ and the step of estimating the interference-and-noise sum $P_{other}(t_1)+P_N(t_1)$ further comprise:

determining whether a HARQ process is active at the time $t_1$, wherein the load utilization probability estimate $\hat{p}_{load}(t_1)$ and the interference-and-noise sum estimate $\hat{P}_{other}(t_1)+\hat{P}_N(t_1)$ are obtained based on the measured total wideband power $y_{RTWP}(t_1)$ when it is determined that the HARQ process is active at the time at the time $t_1$, and wherein when it is determined that the HARQ process is not active at the time at the time $t_1$, the load utilization probability estimate $\hat{p}_{load}(t_1)$ is obtained from the previous load utilization probability estimate $\hat{p}_{load}(t_0)$ and the interference-and-noise sum estimate $\hat{P}_{other}(t_1)+\hat{P}_N(t_1)$ is obtained from the previous interference-and-noise sum estimate $\hat{P}_{other}(t_0))+\hat{P}_N(t_0)$.

8. The method claim 6, wherein when it is determined that the HARQ process is active, the step of obtaining the interference-and-noise sum estimate $\hat{P}_{other}(t_1)+\hat{P}_N(t_1)$ comprises:

determining a gain factor $g(t_1)$ based on the load utilization probability estimate $\hat{p}_{load}(t_1)$ and the scheduled load factor $L_{own}(t_0)$;

modeling the measured total wideband power $y_{RTWP}(t_1)$ as a combination of the interference-and-noise sum estimate $\hat{P}_{other}(t_1)+\hat{P}_N(t_1)$ weighted by the gain factor $g(t_1)$ and a measurement uncertainty $e_{RTWP}(t_1)$; and obtaining the interference-and-noise sum estimate $\hat{P}_{other}(t_1)+\hat{P}_N(t_1)$ based on the measured total wideband power $y_{RTWP}(t_1)$ and the model thereof.

9. The method of claim 8, wherein the step of determining the gain factor $g(t_1)$ comprises:

determining a load factor bias $\Delta L_{own}(t_1)$; and determining the gain factor $g(t_1)$ based on the based at least on the load utilization probability estimate $\hat{p}_{load}(t_1)$ the scheduled load factor $L_{own}(t_0)$, and the load factor bias $\Delta L_{own}(t_1)$, wherein the load factor bias $\Delta L_{own}(t)$ expresses an error of the scheduled load factor $L_{own}(t)$.

10. The method of claim 3, wherein the step of estimating the load utilization probability $p_{load}(t_1)$ and the step of estimating the interference-and-noise sum $P_{other}(t_1)+P_N(t_1)$ comprise:

modeling in a state vector $x(t)$ of the state space model a first state $x_1(t)=p_{load}(t)$ as a load utilization probability, a second state $x_2(t)=P_{other}(t)+P_N(t)$ as the interference-and-noise sum, a third state $x_3(t)=\Delta L_{own}(t)$ as a load factor bias expressing an error of a scheduled load factor, and a fourth state $x_4(t)=x_1(t-T)$ reflecting that the load utilization probability measurement is subject to a delay corresponding to the sampling period T;

modeling a measured total wideband power $y_{RTWP}(t)$ and a measured load utilization $y_{loadUtilization}(t)$ in an output measurement vector $y(t)$ of the state space model;

obtaining a predicted state vector $\hat{x}(t_1|t_0)$ which includes therein first and second predicted states $\hat{x}_1(t_1|t_0)$, $\hat{x}_2(t_1|t_0)$ whose values are based on the load utilization probability estimate $\hat{p}_{load}(t_0)$ and the interference-and-noise sum estimate $\hat{P}_{other}(t_0)+\hat{P}_N(t_0)$;

updating the predicted state vector $\hat{x}(t_1|t_0)$ based on one or more measurements included in an output measurement vector $y(t_1)$ applicable at the time $t_1$ to obtain an estimated state vector $\hat{x}(t_1|t_1)=\hat{x}(t_1)$; and obtaining first and second estimated states $\hat{x}_1(t_1)$, $\hat{x}_2(t_1)$ from the estimated state vector $\hat{x}(t_1)$ respectively as the load utilization probability estimate $\hat{x}_1(t_1) = \hat{p}_{load}(t_1)$ and the interference-and-noise sum estimate $\hat{x}_2(t_1) = \hat{P}_{other}(t_1) + \hat{P}_N(t_1)$, wherein modeling errors and measurement errors are incorporated in the state space model as a model error vector w(t) and a measurement error vector e(t), wherein the predicted state vector $\hat{x}(t|t-T)$ denotes a prediction of the state vector x(t) based on information available up to a time t−T, and wherein the estimated state vector $\hat{x}(t|t) = \hat{x}(t)$ denotes an estimate of the state vector x(t) based on information available up to the time t.

11. The method of claim 10, wherein the step of estimating the load utilization probability $p_{load}(t_1)$ and the step of estimating the interference-and-noise sum $P_{other}(t_1) + P_N(t_1)$ further comprise:

determining whether a HARQ process is active at the time $t_1$, wherein the steps of modeling the states in the state vector x(t), modeling the outputs in the output measurement vector y(t), obtaining the predicted state vector $\hat{x}(t_1|t_0)$, and updating the predicted state vector $\hat{x}(t_1|t_0)$ are performed only when it is determined that the HARQ process is active, and wherein the first and second estimated states $\hat{x}_1(t_1)$, $\hat{x}_2(t_1)$ are obtained from the previous the previous states $\hat{x}_1(t_0)$, $\hat{x}_2(t_0)$ when it is determined that the HARQ process is not active at the time at the time $t_1$.

12. The method of claim 10, wherein the step of updating the predicted state vector $\hat{x}(t_1|t_0)$ comprises:

modeling the measured total wideband power $y_{RTWP}(t_1)$ applicable at the time $t_1$ as $$y_{RTWP}(t_1) = \frac{x_2(t_1)}{1 - L_{own}(t_1 - T_D)x_1(t_1) + x_3(t_1)} + e_{RTWP}(t_1),$$

$T_D$ representing a delay between calculation of the schedule and a time the schedule takes effect on an air interface;

modeling the load utilization $y_{loadUtilization}(t_1)$ applicable at the time $t_1$ as $y_{loadUtilization}(t_1) = x_4(t_1) + e_{loadUtilization}(t_1)$;

obtaining the measurement matrix $C(t_1)$ around the predicted state vector $\hat{x}(t_1|t_0)$, the predicted state vector $\hat{x}(t_1|t_0)$ including first, second, third, and fourth predicted states $\hat{x}_1(t_1|t_0)$, $\hat{x}_2(t_1|t_0)$, $\hat{x}_3(t_1|t_0)$, $\hat{x}_4(t_1|t_0)$ predicted based on data upto the time $t_0$;

obtaining a Kalman gain matrix $K_f(t_1)$ based on at least the measurement matrix $C(t_1)$, the measurement error vector $e(t_1)$, and a predicted covariance matrix $P(t_1|t_0)$ corresponding to the predicted state vector $\hat{x}(t_1|t_0)$;

updating the predicted state vector $\hat{x}(t_1|t_0)$ based on at least the Kalman gain matrix $K_f(t_1)$, the output measurement vector $y(t_1)$, and the measurement vector $c(x(t_1))$ to obtain the estimated state vector $\hat{x}(t_1|t_1) = \hat{x}(t_1)$, the estimated state vector $\hat{x}(t_1)$ including the first, second, third, and fourth estimated states $\hat{x}_1(t_1)$, $\hat{x}_2(t_1)$, $\hat{x}_3(t_1)$, $\hat{x}_4(t_1)$; and updating the predicted covariance matrix $P(t_1|t_0)$ based on at least the Kalman gain matrix $K_f(t_1)$ and the measurement matrix $C(t_1)$ to obtain an updated covariance matrix $P(t_1|t_1)$ corresponding to the estimated state vector $\hat{x}(t_1)$.

13. The method of claim 10, wherein the step of obtaining the measurement matrix $C(t_1)$ comprises:

determining whether a HARQ process is active at the time $t_1$;

determining the measurement matrix $C(t_1)$ linearized around the predicted state vector $\hat{x}(t_1|t_0)$ such that $$C(t) = \frac{\partial c(x)}{\partial x}\bigg|_{x=\hat{x}(t1|t0)}$$

when it is determined that the HARQ process is active at the time $t_1$; and settings the measurement matrix $C(t_1)$ to a predetermined value when it is determined that the HARQ process is not active at the time $t_1$, wherein the step of obtaining the Kalman gain matrix $K_f(t_1)$ comprises determining $K_f(t_1) = P(t_1|t_0)C^T(t_1)(C(t_1)P(t_1|t_0)C^T(t_1) + R_2(t_1))^{-1}$ in which $C^T(t)$ is a transpose of the measurement matrix C(t) and $(R_2(t))$ is a measurement covariance matrix corresponding to the measurement error vector e(t), wherein the step of updating the predicted state vector $\hat{x}(t_1|t_0)$ to obtain the estimated state vector $\hat{x}(t_1|t_1) = \hat{x}(t_1)$ comprises determining $\hat{x}(t_1|t_1) = \hat{x}(t_1|t_0) + K_f(t_1)(y(t_1) - c(\hat{x}(t_1|t_0)))$, and wherein the step of updating the predicted covariance matrix $P(t_1|t_0)$ to obtain the updated covariance matrix $P(t_1|t_1)$ comprises determining $P(t_1|t_1) = P(t_1|t_0) - K_f(t_1)C(t_1)P(t_1|t_0)$.

14. The method of claim 10, wherein the step of estimating the load utilization probability $p_{load}(t_1)$ and the step of estimating the interference-and-noise sum $P_{other}(t_1) + P_N(t_1)$ further comprise:

projecting the estimated state vector $\hat{x}(t_1)$ based on at least the system matrix $A(t_1)$ to obtain a predicted state vector $\hat{x}(t_2|t_1)$ which includes the first, second, third, and fourth predicted states $\hat{x}_1(t_2|t_1)$, $\hat{x}_2(t_2|t_1)$, $\hat{x}_3(t_2|t_1)$, $\hat{x}_4(t_2|t_1)$, in which the first and second predicted states $\hat{x}_1(t_2|t_1)$ and $\hat{x}_2(t_2|t_1)$ values are based on the load utilization probability estimate $\hat{p}_{load}(t_1)$ and the interference-and-noise sum estimate $\hat{P}_{other}(t_1) + \hat{P}_N(t_1)$; and projecting the updated covariance matrix $P(t_1|t_1)$ to obtain a predicted covariance matrix $P(t_2|t_1)$ based on at least the system matrix $A(t_1)$ and a system noise covariance matrix $R_1(t_1)$, wherein the state space model is characterized through equations $x(t+T) = A(t)x(t) + B(t)u(t) + w(t)$ and $y(t) = c(x(t)) + e(t)$, in which x(t) represents the state vector, u(t) represents an input vector, y(t) represents the output measurement vector, w(t) represents the model error vector, e(t) represents the measurement error vector, A(t) represents a system matrix describing dynamic modes of the system, B(t) represents an input gain matrix, c(x(t)) represents a measurement vector which is a function of the states of the system, t represents the time and T represents a sampling period.

15. The method of claim 1, wherein the step of estimating the other cell interference $P_{other}(t_1)$ comprises:

obtaining a thermal noise floor estimate $\hat{N}(t_1)$ corresponding to the cell of interest as the thermal noise estimate $\hat{P}_N(t_1)$; and subtracting the thermal noise estimate $\hat{P}_N(t_1)$ from the interference-and-noise sum estimate $\hat{P}_{other}(t_1) + \hat{P}_N(t_1)$ to obtain the other cell interference estimate $\hat{P}_{other}(t_1)$.

16. A radio network node of a wireless network, the radio network node corresponding to a cell of interest and being structured to determine an other cell interference $P_{other}(t)$, the radio network node comprising:
- a transceiver structured to transmit and receive wireless signals via one or more antennas from and to one or more cell terminals located within the cell of interest;
- a communicator structured to communicate with other network nodes; and
- an interference estimator structured to:
  - estimate an interference-and-noise sum $P_{other}(t_1)+P_N(t_1)$ based at least on a load utilization probability estimate $\hat{p}_{load}(t_0)$ and an interference-and-noise sum estimate $\hat{P}_{other}(t_0)+\hat{P}_N(t_0)$ applicable at a time $t_0$ to obtain an interference-and-noise sum estimate $\hat{P}_{other}(t_1)+\hat{P}_N(t_1)$ applicable at the time $t_1$, and
  - estimate an other cell interference $P_{other}(t_1)$ based at least on the interference-and-noise sum estimate $\hat{P}_{other}(t_1)+\hat{P}_N(t_1)$ and a thermal noise estimate $\hat{P}_N(t_1)$ to obtain an other cell interference estimate $\hat{P}_{other}(t_1)$ applicable at the time $t_1$,
- wherein the interference-and-noise sum $P_{other}(t)+P_N(t)$ expresses a sum of undesired signals, other than an own cell load $P_{own}(t)$, applicable at the time t, and the interference-and-noise sum estimate $\hat{P}_{other}(t)+\hat{P}_N(t)$ being an estimate thereof, the own cell load $P_{own}(t)$ expressing a sum of signals due to wireless activities in the cell of interest applicable at the time t,
- wherein the other cell interference $P_{other}(t)$ expresses a sum of interferences present in the cell of interest due to wireless activities applicable at the time t in one or more cells other than in the cell of interest, and the other cell interference estimate $\hat{P}_{other}(t)$ being an estimate thereof,
- wherein a thermal noise $P_N(t)$ expresses a sum of undesired signals present in the cell of interest at the time t other than the own cell load $P_{own}(t)$ and other than the other cell interference $P_{other}(t)$ and the thermal noise estimate $\hat{P}_N(t)$ being an estimate thereof, and
- wherein the interference-and-noise sum estimate $\hat{P}_{other}(t)+\hat{P}_N(t)$ and the other cell interference estimate $\hat{P}_{other}(t_1)$ are based on a state space model comprising at least a measurement matrix $C(t_1)$.

17. The radio network node of claim 16, wherein the scheduler is a TD-scheduler with M processors, each processor being structured to estimate the other cell interference $P_{other}(t_1)$ only for each TD slot in a subset of TD slots, the subset being determined as a union of TD slots in which a same set of wireless terminals are scheduled.

18. The radio network node of claim 16, wherein the interference estimator further structured to:
- estimate a load utilization probability $p_{load}(t_1)$ based at least on the load utilization probability estimate $\hat{p}_{load}(t_0)$ and the interference-and-noise sum estimate $\hat{P}_{other}(t_0)+\hat{P}_N(t_0)$ applicable at the time $t_0$ to obtain a utilization probability estimate $\hat{p}_{load}(t_1)$ applicable at the time $t_1$,
- wherein the load utilization probability $p_{load}(t)$ expresses a relationships between radio resource grants scheduled to one or more cell terminals and radio resource grants used by the same cell terminals applicable at a time t, each cell terminal being a wireless terminal in the cell of interest, and the load utilization probability estimate $\hat{p}_{load}(t)$ being an estimate thereof, and
- wherein the load utilization probability estimate $\hat{p}_{load}(t)$ is estimated based on the state space model comprising at least the measurement matrix $C(t_1)$.

19. The radio network node of claim 18, further comprising a load meter structured to calculate a scheduled load factor $L_{own}(t_1-T_D)$, obtain a used load factor $\overline{L}_{own}(t_1-T_D)$ and measure a load utilization $$\frac{\overline{L}_{own}(t_1 - T_D)}{L_{own}(t_1 - T_D)}$$

based on the scheduled and measured load factors,
- wherein in order to estimate the load utilization probability $p_{load}(t_1)$ and estimate the interference-and-noise sum $P_{other}(t_1)+P_N(t_1)$ the interference estimator is structured to obtain a utilization probability estimate $\hat{p}_{load}(t_1)$ and obtain the interference-and-noise sum estimate $\hat{P}_{other}(t_1)+\hat{P}_N(t_1)$,
- wherein the scheduled load factor $L_{own}(t-T_D)$ expresses an amount of the radio resource grants scheduled to be used by the cell terminals for uplink transmissions at the time t, and
- wherein the used load factor $\overline{L}_{own}(t-T_D)$ expresses an amount of the scheduled radio resource grants used by the cell terminals for the uplink transmissions at the time t, and
- wherein $T_D$ represents a delay between calculation of the scheduled load factor and a time the schedule takes effect on an air interface.

20. The radio network node of claim 19, wherein the interference estimator is further structured to:
- determine whether a HARQ process is active at the time $t_1$,
- obtain the load utilization probability estimate $\hat{p}_{load}(t_1)$ and the interference-and-noise sum estimate $\hat{P}_{other}(t_1)+\hat{P}_N(t_1)$ based on the measured load utilization $$\frac{\overline{L}_{own}(t_1 - T_D)}{L_{own}(t_1 - T_D)}$$

when it is determined that the HARQ process is active, and
- obtain the load utilization probability estimate $\hat{p}_{load}(t_1)$ from the previous load utilization probability estimate $\hat{p}_{load}(t_0)$ and to obtain the interference-and-noise sum estimate $\hat{P}_{other}(t_1)+\hat{P}_N(t_1)$ from the previous interference-and-noise sum estimate $\hat{P}_{other}(t_0)+\hat{P}_N(t_0)$ when it is determined that the HARQ process is not active.

21. The radio network node of claim 18, further comprising a wideband meter structured to measure a total wideband power $y_{RTWP}(t_1)$,
- wherein in order to estimate the load utilization probability $\hat{p}_{load}(t_1)$ and estimate the interference-and-noise sum $P_{other}(t_1)+P_N(t_1)$, the interference estimator is structured to obtain the load utilization probability estimate $\hat{p}_{load}(t_1)$ and obtain the interference-and-noise sum estimate $\hat{P}_{other}(t_1)+\hat{P}_N(t_1)$.

22. The radio network node of claim 21, wherein in order to estimate the load utilization probability $p_{load}(t_1)$ and estimate the interference-and-noise sum $P_{other}(t_1)+P_N(t_1)$ the interference estimator is further structured to:
- determine whether a HARQ process is active at the time $t_1$,
- obtain the load utilization probability estimate $\hat{p}_{load}(t_1)$ and the interference-and-noise sum estimate $\hat{P}_{other}(t_1)+\hat{P}_N(t_1)$ based on the measured total wideband power $y_{RTWP}(t_1)$ when it is determined that the HARQ process is active at the time at the time $t_1$, and obtain the load utilization probability estimate $\hat{p}_{load}(t_1)$ from the previous load utilization probability estimate $\hat{p}_{load}(t_0)$ and to obtain the interference-and-noise sum estimate $\hat{P}_{other}(t_1)+\hat{P}_N(t_1)$ from the previous interference-and-noise sum estimate $\hat{P}_{other}(t_0)+\hat{P}_N(t_0)$ when it is determined that the HARQ process is not active at the time at the time $t_1$.

23. The radio network node of claim 21, wherein in order to obtain the interference-and-noise sum $P_{other}(t_1)+P_N(t_1)$, the interference estimator is further structured to:
  determine a gain factor $g(t_1)$ based on the load utilization probability estimate $\hat{p}_{load}(t_1)$ and the scheduled load factor $L_{own}(t_0)$,
  model the measured total wideband power $y_{RTWP}(t_1)$ as a combination of the interference-and-noise sum estimate $\hat{P}_{other}(t_1)+\hat{P}_N(t_1)$ weighted by the gain factor $g(t_1)$ and a measurement uncertainty $e_{RTWP}(t_1)$, and
  obtain the interference-and-noise sum estimate $\hat{P}_{other}(t_1)+P_N(t_1)$ based on the measured total wideband power $y_{RTWP}(t_1)$ and the model thereof.

24. The radio network node of claim 23, wherein in order to determine the gain factor $g(t_1)$, the interference estimator is structured to:
  determine a load factor bias $\Delta L_{own}(t_1)$, and
  determine the gain factor $g(t_1)$ based on the based at least on the load utilization probability estimate $\hat{p}_{load}(t_1)$ the scheduled load factor $L_{own}(t_0)$, and the load factor bias $\Delta L_{own}(t_1)$,
  wherein the load factor bias $\Delta L_{own}(t)$ expresses an error of the scheduled load factor $L_{own}(t)$.

25. The radio network node claim 18, wherein in order to estimate the load utilization probability $p_{load}(t_1)$ and estimate the interference-and-noise sum $P_{other}(t_1)+P_N(t_1)$ the interference estimator is structured to:
  model in a state vector $x(t)$ of the state space model a first state $x_1(t)=p_{load}(t)$ as a load utilization probability, a second state $x_2(t)=P_{other}(t)+P_N(t)$ as the interference-and-noise sum, a third state $x_3(t)=\Delta L_{own}(t)$ as a load factor bias expressing an error of a scheduled load factor, and a fourth state $x_4(t)=x_1(t-T)$ reflecting that the load utilization probability measurement is subject to a delay corresponding to the sampling period T,
  model a measured total wideband power $y_{RTWP}(t)$ and a measured load utilization $y_{loadUtilization}(t)$ in an output measurement vector $y(t)$ of the state space model,
  obtain a predicted state vector $\hat{x}(t_1|t_0)$ which includes therein first and second predicted states $\hat{x}_1(t_1|t_0)$, $\hat{x}_2(t_1|t_0)$ whose values are based on the load utilization probability estimate $\hat{p}_{load}(t_0)$ and the interference-and-noise sum estimate $\hat{P}_{other}(t_0)+\hat{P}_N(t_0)$,
  update the predicted state vector $\hat{x}(t_1|t_0)$ based on one or more measurements included in an output measurement vector $y(t_1)$ applicable at the time $t_1$ to obtain an estimated state vector $\hat{x}(t_1|t_1)=\hat{x}(t_1)$, and
  obtain first and second estimated states $\hat{x}_1(t_1)$, $\hat{x}_2(t_1)$ from the estimated state vector $\hat{x}(t_1)$ respectively as the load utilization probability estimate $\hat{x}_1(t_1)=\hat{p}_{load}(t_1)$ and the interference-and-noise sum estimate $\hat{x}_2(t_1)=P_{other}(t_1)+\hat{P}_N(t_1)$,
  wherein modeling errors and measurement errors are incorporated in the state space model as a model error vector $w(t)$ and a measurement error vector $e(t)$,
  wherein the predicted state vector $\hat{x}(t|t-T)$ denotes a prediction of the state vector $x(t)$ based on information available up to a time $t-T$, and
  wherein the estimated state vector $\hat{x}(t|t)=\hat{x}(t)$ denotes an estimate of the state vector $x(t)$ based on information available up to the time t.

26. The radio network node of claim 25, wherein in order to estimate the load utilization probability $p_{load}(t_1)$ and estimate the interference-and-noise sum $P_{other}(t_1)+P_N(t_1)$ the interference estimator is further structured to:
  determine whether a HARQ process is active at the time $t_1$,
  wherein the interference estimator is structured to model the states in the state vector $x(t)$, model the outputs in the output measurement vector $y(t)$, obtain the predicted state vector $\hat{x}(t_1|t_0)$, and update the predicted state vector $\hat{x}(t_1|t_0)$ only when it is determined that the HARQ process is active, and
  wherein the interference estimator is structured to obtain the first and second estimated states $\hat{x}_1(t_1)$, $\hat{x}_2(t_1)$ from the previous the previous states $\hat{x}_1(t_0)$, $\hat{x}_2(t_0)$ when it is determined that the HARQ process is not active at the time at the time $t_1$.

27. The radio network node of claim 25, wherein in order to update the predicted state vector $\hat{x}(t_1|t_0)$, the interference estimator is structured to:
  model the measured total wideband power $y_{RTWP}(t_1)$ applicable at the time $t_1$ as $$y_{RTWP}(t_1) = \frac{x_2(t_1)}{1 - L_{own}(t_1 - T_D)x_1(t_1) + x_3(t_1)} + e_{RTWP}(t_1),$$

$T_D$ representing a delay between calculation of the schedule and a time the schedule takes effect on an air interface,
  model the load utilization $y_{loadUtilization}(t_1)$ applicable at the time $t_1$ as $y_{loadUtilization}(t_1)=x_4(t_1)+e_{loadUtilization}(t_1)$
  obtain the measurement matrix $C(t_1)$ around the predicted state vector $\hat{x}(t_1|t_0)$, the predicted state vector $\hat{x}(t_1|t_0)$ including first, second, third, and fourth predicted states $\hat{x}_1(t_1|t_0)$, $\hat{x}_2(t_1|t_0)$, $\hat{x}_3(t_1|t_0)$, $\hat{x}_4(t_1|t_0)$ predicted based on data upto the time $t_0$/,
  obtain a Kalman gain matrix $K_f(t_1)$ based on at least the measurement matrix $C(t_1)$, the measurement error vector $e(t_1)$, and a predicted covariance matrix $P(t_1|t_0)$ corresponding to the predicted state vector $\hat{x}(t_1|t_0)$,
  update the predicted state vector $\hat{x}(t_1|t_0)$ based on at least the Kalman gain matrix $K_f(t_1)$, the output measurement vector $y(t_1)$, and the measurement vector $c(x(t_1))$ to obtain the estimated state vector $\hat{x}(t_1|t_1)=\hat{x}(t_1)$, the estimated state vector $\hat{x}(t_1)$ including the first, second, third, and fourth estimated states $\hat{x}_1(t_1)$, $\hat{x}_2(t_1)$, $\hat{x}_3(t_1)$, $\hat{x}_4(t_1)$, and
  update the predicted covariance matrix $P(t_1|t_0)$ based on at least the Kalman gain matrix $K_f(t_1)$ and the measurement matrix $C(t_1)$ to obtain an updated covariance matrix $P(t_1|t_1)$ corresponding to the estimated state vector $\hat{x}(t_1)$.

28. The radio network node of claim 25, wherein in order to obtain the measurement matrix $C(t_1)$, the interference estimator is structured to:
  determine whether a HARQ process is active at the time $t_1$,
  determine the measurement matrix $C(t_1)$ linearized around the predicted state vector $\hat{x}(t_1|t_0)$ such that $$C(t) = \frac{\partial c(x)}{\partial x}\bigg|_{x=\hat{x}(t1|t0)}$$

when it is determined that the HARQ process is active at the time $t_1$, and set the measurement matrix $C(t_1)$ to a predetermined value when it is determined that the HARQ process is not active at the time $t_1$, wherein in order to obtain the Kalman gain matrix $K_f(t_1)$, the interference estimator is structured to determine $K_f(t_1)=P(t_1|t_0)C^T(t_1)(C(t_1)P(t_1|t_0)C^T(t_1)+R_2(t_1))^{-1}$ in which $C^T(t)$ is a transpose of the measurement matrix $C(t)$ and $(R_2(t))$ is a measurement covariance matrix corresponding to the measurement error vector $e(t)$, wherein in order to update the predicted state vector $\hat{x}(t_1|t_0)$ to obtain the estimated state vector $\hat{x}(t_1|t_1)=\hat{x}(t_1)$, the interference estimator is structured to determine $\hat{x}(t_1|t_1)=\hat{x}(t_1|t_0)+K_f(t_1)(y(t_1)-c(\hat{x}(t_1|t_0)))$, and wherein in order to update the predicted covariance matrix $P(t_1|t_0)$ to obtain the updated covariance matrix $P(t_1|t_1)$, the interference estimator is structured to determine $P(t_1|t_1)=P(t_1|t_0)-K_f(t_1)C(t_1)P(t_1|t_0)$.

29. The radio network node of claim 25, wherein in order to estimate the load utilization probability $p_{load}(t_1)$ and estimate the interference-and-noise sum $P_{other}(t_1)+P_N(t_1)$, the interference estimator is further structured to:

project the estimated state vector $\hat{x}(t_1)$ based on at least the system matrix $A(t_1)$ to obtain a predicted state vector $\hat{x}(t_2|t_1)$ which includes the first, second, third, and fourth predicted states $\hat{x}_1(t_2|t_1)$, $\hat{x}_2(t_2|t_1)$, $\hat{x}_3(t_2|t_1)$, $\hat{x}_4(t_2|t_1)$, in which the first and second predicted states $\hat{x}_1(t_2|t_1)$ and $\hat{x}_2(t_2|t_1)$ values are based on the load utilization probability estimate $\hat{p}_{load}(t_1)$ and the interference-and-noise sum estimate $\hat{P}_{other}(t_1)+\hat{P}_N(t_1)$, and project the updated covariance matrix $P(t_1|t_1)$ to obtain a predicted covariance matrix $P(t_2|t_1)$ based on at least the system matrix $A(t_1)$ and a system noise covariance matrix $R_1(t_1)$, wherein the state space model is characterized through equations $x(t+T)=A(t)x(t)+B(t)u(t)+w(t)$ and $y(t)=c(x(t))+e(t)$, in which $x(t)$ represents the state vector, $u(t)$ represents an input vector, $y(t)$ represents the output measurement vector, $w(t)$ represents the model error vector, $e(t)$ represents the measurement error vector, $A(t)$ represents a system matrix describing dynamic modes of the system, $B(t)$ represents an input gain matrix, $c(x(t))$ represents a measurement vector which is a function of the states of the system, t represents the time and T represents a sampling period.

30. The radio network node of claim 16, further comprising a noise estimator structured to obtain a thermal noise floor estimate $\hat{N}(t_1)$ corresponding to the cell of interest as the thermal noise estimate $\hat{P}_N(t_1)$, wherein in order to estimate the other cell interference $P_{other}(t_1)$ the interference estimator is structured to subtract the thermal noise estimate $\hat{P}_N(t_1)$ from the interference-and-noise sum estimate $\hat{P}_{other}(t_1)+\hat{P}_N(t_1)$ to obtain the other cell interference estimate $\hat{P}_{other}(t_1)$.

31. A non-transitory computer-readable medium which has stored therein programming instructions, wherein when a computer executes the programming instructions, the computer executes a method performed in a radio network node of a wireless network for determining other cell interference, wherein the method is the method of claim 1.

* * * * *